United States Patent
Dudmesh et al.

(10) Patent No.: US 11,201,929 B2
(45) Date of Patent: Dec. 14, 2021

(54) ON-LINE BROWSING PREFERENCE MANAGEMENT

(71) Applicant: CRIMTAN HOLDINGS LIMITED, London (GB)

(72) Inventors: John Dudmesh, London (GB); Denis Orlov, London (GB); Ian Curson, London (GB); Andy Houstoun, London (GB)

(73) Assignee: CRIMTAN HOLDINGS LIMITED, London (GB)

( * ) Notice: Subject to any disclaimer, the term of this patent is extended or adjusted under 35 U.S.C. 154(b) by 0 days.

(21) Appl. No.: 17/052,510

(22) PCT Filed: May 1, 2019

(86) PCT No.: PCT/GB2019/051212
§ 371 (c)(1),
(2) Date: Nov. 2, 2020

(87) PCT Pub. No.: WO2019/211607
PCT Pub. Date: Nov. 7, 2019

(65) Prior Publication Data
US 2021/0243262 A1    Aug. 5, 2021

(30) Foreign Application Priority Data

May 1, 2018 (GB) ..................................... 1807183

(51) Int. Cl.
*G06F 15/173* (2006.01)
*H04L 29/08* (2006.01)
(Continued)

(52) U.S. Cl.
CPC .......... *H04L 67/146* (2013.01); *G06F 16/951* (2019.01); *G06F 16/957* (2019.01); *G06F 16/9566* (2019.01); *H04L 67/22* (2013.01)

(58) Field of Classification Search
None
See application file for complete search history.

(56) References Cited

U.S. PATENT DOCUMENTS 9,553,917 B2    1/2017   Manion et al.
2007/0299873 A1* 12/2007  Jones ................... G06F 16/907
(Continued)

FOREIGN PATENT DOCUMENTS

EP            3 151 541 A1    4/2017

OTHER PUBLICATIONS

PCT International Search Report and Written Opinion, PCT/GB2019/051212, dated Aug. 23, 2019, 13 Pages.

*Primary Examiner* — Phuoc H Nguyen
(74) *Attorney, Agent, or Firm* — Fenwick & West LLP

(57) ABSTRACT

A computer-implemented method of providing one or more selected tracking tags to a domain owner server for deployment on a website is described. The one or more tracking tags are selected from a set of available tracking tags and the method comprises: storing the set of available tracking tags, each available tracking tag including a purpose parameter describing a use to which data collected by the available tracking tag will be put; storing a plurality of user identifiers and a plurality of sets of tag-selection parameters, each user identifier identifying a website user and having an associated set of tag-selection parameters which identity a specific tracking tag and indicate whether a user consent has been obtained for a specific purpose of the specific tag; receiving, from the domain owner server, a request for deployment of one or more tracking tags on the website, the request including a received user identifier identifying a user accessing the website; for a user identifier corresponding to the received user identifier, comparing the tag-parameters for each specific tracking tag to the purpose parameter of each corresponding available tracking tag; selecting available
(Continued)

tracking tags where the purpose parameter of the available tracking tag corresponds to a specific purpose which has an indication of user consent in the corresponding tag-selection parameters; and transmitting the selected available tracking tags to the domain owner server for deployment on the website.

19 Claims, 13 Drawing Sheets

(51) Int. Cl.
*G06F 16/957* (2019.01)
*G06F 16/951* (2019.01)
*G06F 16/955* (2019.01)

(56) References Cited

U.S. PATENT DOCUMENTS

| | | | |
|---|---|---|---|
| 2009/0112736 A1* | 4/2009 | Chehebar | G06Q 30/0601 705/26.1 |
| 2011/0314092 A1* | 12/2011 | Lunt | H04L 67/10 709/203 |
| 2013/0254649 A1 | 9/2013 | O'Neill et al. | |
| 2017/0094030 A1 | 3/2017 | Schumacher | |
| 2017/0109327 A1* | 4/2017 | Lei | G06F 40/221 |

* cited by examiner

Example prior art tag data structure

Example modified tag data structure

Example consentag data structure

ON-LINE BROWSING PREFERENCE MANAGEMENT

FIELD OF THE INVENTION

The present invention relates to a system for controlling user interaction via an application with remote servers and more specifically, though not exclusively, to a system for controlling third-party data gathering actions from user interactions in real time. The present invention has application primarily to Internet browsers where cookies are used but also to any application where user interaction with an application can give rise to third party data gathering action relating to the user interaction.

BACKGROUND OF THE INVENTION

Websites provide numerous services for users around the world, ranging from simple provision of information to more complex e-commerce solutions and media streaming platforms. These services are used by millions of users each day globally. In addition to the content which is visible on the pages of the website that are displayed, many websites also contain small hidden portions of code called 'tags' (or equivalently 'pixels') which mostly remain hidden from the viewer of the webpage. These tags are provided in order to monitor and gather data relating to a user's interaction with a website, which can indicative of the user's behaviour with respect to the content of the website, and to deliver this valuable information to another party which acts as a data collector. These tags are often integrated into the website in order to perform a specific task such as advertising, live chat, and product recommendations. Each tag is associated with a rule or set of rules which relate to the user interactions with the website, which can be clicking on something, filling a form or specific user navigation within the website, for example.

Tags are often delivered to a webpage through use of tag management platforms (TMP). A TMP enables implementation, management, and maintenance of multiple tags from multiple data collectors on web or mobile sites typically with an easy to use web interface for the owner of the website domain. Using a TMP enables data collection about specific user interaction with websites and provides invaluable feedback about the performance of the website, in relation to user interaction, helping to drive better customer experiences for example by identifying poorly structured or poorly implemented parts of the website functionality.

Whilst tags are useful for website domain owners and third-party data collectors, it is to be appreciated that not all users want their user interaction with a website or their behaviour to be monitored, either in general or by a particular third party for a particular purpose (e.g. to deliver advertising regarding relevant products). In recognition of this, there exists regulation governing how and when the information can be used. In particular, it is now often necessary for website domain owners to obtain the consent of a user before data regarding that user's behaviour can be delivered to or used by a particular collector. Correct management of a user's consent is therefore often crucial when utilising tags. User consent management is typically achieved via use of a Consent Management Platform (CMP).

CMPs focus on the gathering and storing of consent of user choice for particular entities and purposes across different website domains. User opt-in is gathered and stored by the domain owner via the CMP for creating an audit trail of proof and should ideally also be used to build rules to deliver any tags to the website domain that captures the behaviour of the user based only if the user has consented for the domain owner to do so.

In known systems, CMPs and TMPs are operated independently of one another. TMPs rely on the CMPs to ensure that the data which has been gathered is only delivered to and used by data collectors that have been approved for consented purposes. In typical operation, a CMP collects information regarding the consent of a user for a particular data collector and delivers this consent information to the data collector.

The data collector then implements these consent choices when receiving data that has been collected and transmitted by the tags regarding a particular user. Upon receipt of a data transmission, the data collector verifies whether it has permission to collect and use this data in accordance with the consent choices collected by the CMP. If it has permission, then the data collected by the tag is received by the data collector and used in accordance with its consented purpose. If it does not have permission, then the data is disregarded and not used.

An example of an arrangement of a prior art system 10 is shown in FIG. 1. The illustration shows components included in a system 10 in which a user visits a website 26 on a domain owner server 24 and manages consents for the collection and use of their website interaction data (also referred to herein as 'behaviour data') using tags 28. Communication between each of the components is typically achieved via an external communications network 11.

This prior art system 10 includes a general consent management platform server 12 for handling all of the consents for each user relating to tags included in a website, each data collector and each purpose. For ease of reference, only one domain site is shown although it is to be understood that this is for illustrative purposes only and typically there are a plurality of website domains managed within system 10. The consent management platform server 12 is connected to a database 14 which stores the consents 16 received for each domain owner in a DOA consents log.

Also shown is a client computer device 18 having a browser 20 and conventional cookies 22 placed by the consent management platform server 12 to implement the determination of consent for data collection for that website. Cookies 22 are online identifiers that are put on users' browsers 20 to facilitate tracking of user interaction with the website using that browser 20, for example specific user interaction via the browser 20 to determine user behaviour or choices regarding the website 26. Cookies can be put in 1st party domains (in the domain by the owner of the domain) and 3rd party domains (in the domain by a 3rd party of that domain such as a data collector or an advertiser). A consent choice logger 29 is also provided at the user computer/device which uses the cookies 22 and simply records user consent for that domain and provides this to the consent management platform server 12.

In addition, the prior art system 10 also includes a tag management platform server 30 which enables the website domain owner to configure their websites 26 to have appropriate tags 28 embedded within them to provide user interaction feedback to data collectors when a webpage is loaded and the user interacts with the webpage. In this regard, a conventional data structure 32 is defined for each tag at the tag management platform server 30 and stored there. Some rules for data collection 32, 34 (namely the rules under which a tag 28 fires) defined by a domain owner for each data collector (two different data collectors 36, 38 are shown in FIG. 1) are also stored in the tag management platform server 30. Although two data collectors 36, 38 are illustrated, it is to be understood that this is for illustrative purposes only and any number of data collectors may be included within the system 10, each having a specific set of data collection rules 32, 34 at the tag management platform server 30.

Each of the data collectors 36, 38 comprises a server 40, 42 which receives information from tags 28 which have fired as well as from the consent management platform server 12. The data collectors 36, 38 typically additionally comprise databases 44, 46 coupled to the servers 40, 42. These databases 44, 46 typically store the information that has been delivered to them from the tags 28. The databases 44, 46 may also store data relating to the consents of the user, associated to the information collected by the tags 28, delivered by the consent management platform server 12.

Typically the prior art system 10 in use begins operation when a user accesses a website 26 using their browser 20. Upon visiting the website 26, tags 28 which are configured to be embedded within the website 26 are delivered from the tag management platform server 30 to the website 26 as it loads. Additionally, cookies 22 that are included in the website 26 are delivered to the user browser 20. These cookies 20 are used to identify the user and notify their consents regarding the operation of the tags 28. At this point, the user is typically asked to give their consent to the use of cookies and the tracking of their interactions with the websites 26. This consent is stored in the database 14 of the consent management platform server 12. The consent preferences are additionally delivered to the data collector servers 40, 42 by the consent management platform server 12. The consent preferences are utilised by the data collection servers 40, 42 in order to determine whether the information delivered by the tags 28 is able to be used for a particular purpose by the respective data collection server 40, 42. In situations where a user has previously visited the website 26 and a cookie 22 has already been delivered and retained on the user browser 20, the website 26 detects the presence of the cookie 22 and subsequently instruct the consent management platform server 12 to retrieve the consent preferences associated with the owner of the cookie 22 and deliver these to the data collector servers 40, 42.

Following the delivery of the tags 28, the tags 28 monitor the behaviour of the user at the website 26 and fires in accordance with the predefined rules 32, 34 of that tag 28. These rules 32, 34 specify what user interaction events with the website 26 cause the tag 28 to fire (send information about current user interaction in a data message to the tag management platform server 30 and where that information is subsequently sent, for example to which data collector 40, 42). The information collected by the tag 28 is then delivered to the data collector servers 40, 42 where the information is either stored or discarded in accordance with whether the data collector server 40, 42 has the relevant permission to use the delivered data.

Whilst this system is widely employed, there are several issues which are introduced by the use of this system. In the first instance, there is no connectivity between each CMP 12 and TMP 30. Current CMPs gather consent for specific data collectors and purposes for each user but the matrix for choice of data collection can be prohibitively large. For example, 4 purposes and 10 data collectors could result in 40 different rules, against potentially a million users with different preferences. Building in rules across multiple CMPs and TMPs is fraught with issues when dealing with large numbers of combinations such as in the example above. There is no guarantee that two separate systems will deliver the result the user requires based on their choices. There is therefore a likelihood that the currently employed systems may lead to a situation where data is collected by a data collector for a purpose where consent has either not explicitly been given, or has actively been denied.

Furthermore, as noted above, current systems load all tags 28 to be embedded in a website 26 regardless of whether the relevant data collector has the relevant permissions required to collect and use the data collected by each of the tags. As a result, all tags, including those which are unable to be used, are loaded into the webpage, resulting in an additional and redundant processing load. This not only unnecessarily slows down the initial loading time of the website (particularly where there are a high number of tags embedded in the website), but also disadvantageously reduces the performance of the website once it has been loaded, since the code of all loaded tags continues to run and collect data, regardless of whether the data is actually obtained and able to be used by the data collectors 40, 42.

A further problem with the use of cookies in the prior art systems is that cookies can be deleted by the user or blocked by a particular browser setting. Accordingly, relying on cookies to provide user preference data to the system can result in errors and inaccurate results.

The present invention has been devised against this backdrop and seeks to obviate at least some of the above-described problems with existing systems. More particularly, the present invention aims to provide a way of efficiently delivering tags to be embedded in website webpages, and accurately recording the consent information of users regarding the use of these tags.

It is to be appreciated that websites may be viewable on many devices such as personal computers, tablet computers and mobile phones. The invention described herein may be configured to enable the efficient deployment of tags on a website viewed upon any such devices, where the modification of the invention is in accordance with known methodologies.

SUMMARY OF THE INVENTION

According to one aspect of the present invention there is provided a computer-implemented method of providing one or more selected tracking tags to a domain owner server for deployment on a website, the one or more tracking tags being selected from a set of available tracking tags, the method comprising: storing the set of available tracking tags, each available tracking tag including a purpose parameter describing a use to which data collected by the available tracking tag will be put; storing a plurality of user identifiers and a plurality of sets of tag-selection parameters, each user identifier identifying a website user and having an associated set of tag-selection parameters which identity a specific tracking tag and indicate whether a user consent has been obtained for a specific purpose of the specific tag; receiving, from the domain owner server, a request for deployment of one or more tracking tags on the website, the request including a received user identifier identifying a user accessing the website; for a user identifier corresponding to the received user identifier, comparing the tag-selection parameters for each specific tracking tag to the purpose parameter of each corresponding available tracking tag; selecting available tracking tags where the purpose parameter of the available tracking tag corresponds to a specific purpose which has an indication of user consent in the corresponding tag-selection parameters; and transmitting the selected available tracking tags to the domain owner server for deployment on the website.

In this way the present invention solves at least one of the problems of the prior art outlined above. It is possible with the present invention to only deliver tracking tags to a website that are consented by the user to collect data and for this data to be subsequently used for a particular purpose. The prior art would necessarily deliver all tags regardless of whether the tag is consented to be used to collect data. The present invention therefore eliminates redundant tags being delivered to a website, thereby decreasing the loading time of the webpage and reducing required processing resource to load the webpage. In addition, only allowing tags which are able to be used to be deployed on the website reduces the number of processes running on the website once the website is loaded. This increases the performance of the website by reducing the number of redundant tag processes being executed for which no data will be allowed to be used.

In some embodiments the step of storing the plurality of user identifiers may comprise storing tag-selection parameters which indicate whether a user dissent has been determined for a specific purpose of the specific tag.

The method in some embodiments further comprises determining whether a user dissent or a user consent exists in the associated stored set of tag-selection parameters. In this case, if it is determined that no user consent or dissent exists, the method may further comprise obtaining the user consent or the user dissent from the user. This advantageously enables the present invention to ensure that consent is obtained for a particular tracking tag and purpose before a tag is delivered. Furthermore, this enables the present invention to be able to adapt to when new tracking tags are stored and made available between consecutive user visits to a website.

In some embodiments the step of obtaining the user consent comprises: sending a message to the domain owner server requesting consent; and upon receipt of a response from the server indicating the user consent or the user dissent, using of the specific purpose of the specific tag to modify the associated set of tag-selection parameters which identify the specific tracking tag.

In some embodiments the method further comprises providing a consent prompt tag to gather information about the user consent or the user dissent from the user regarding one or more of the available tracking tags which has no user consent or user dissent for a particular purpose. Also the consent prompt tag may be configured, in some embodiments, to generate a consent choice panel in a graphical user interface on the user's browser when deployed on the website. This advantageously provides a tag configured to obtain the required information about the user consent in a format which is usable by the invention.

In some embodiments the method further comprises: determining that the received user identifier does not correspond to any of the stored user identifiers; and using the received user identifier to create a new stored user identifier and providing a corresponding associated set of tag-selection parameters which identify a specific tracking tag and indicate whether the user consent or the user dissent has been obtained for a specific purpose of the specific tag. This advantageously enables the present invention to create new user identifiers in real time, without requiring that a system be provided which requires an initial set up before the process may be enacted. This is particularly advantageous where millions of users may be expected to access a website and performing an initial set up for these users may prove procedurally unwieldy.

The step of storing a plurality of sets of tag-selection parameters may comprise storing plurality of sets of tag-selection parameters where each set of tag-selection parameters comprise: a tag identification parameter identifying a specific tracking tag in the set of available tracking tags; one or more purpose parameters indicating the purpose that data collected by the specific tracking tag will be used for; and one or more binary consent parameters corresponding to each purpose parameter, each binary consent parameter indicating a consent or dissent of a user to the use of the specific tracking tag for the purpose of the corresponding purpose parameter.

The selecting step may comprise selecting available tracking tags where user consent has been identified by having a specific purpose parameter which has a corresponding binary consent parameter consented to in a corresponding set of tag selection parameters.

In an embodiment the request includes a website address and the website address is used to determine a subset of the set of available tracking tags available for the comparing step. This advantageously reduces the number of available tags which may be selected before any selection begin, thereby increasing the processing efficiency of the selection step.

The receiving step may comprise receiving the user identifier in the form of a plurality of triangulation data points, where each triangulation data point describes a part of the user identity pseudonymously and the combination of triangulation points describes the user uniquely. This advantageously allows a user to be identified without providing any personal information about that user. In particular, the specific geographic location and identity of the user are not disclosed, preventing unnecessary transmission of personal data.

In specific embodiments the triangulation data points include one or more of the group comprising: part of an IP address, information determining existence of cookies on user browser, a type of web browser being used by the user, web browser version, device type being used to access the website, local storage identity, entity tag, and an advertiser identity.

The method may further comprise: receiving an update request for updating a set of tag-selection parameters, the request including a further received user identifier and modifying instructions; determining the stored set of tag selection parameters of the user identifier corresponding to the further received user identifier; and modifying the stored set of tag selection parameters of the user identifier in accordance with the received modifying instructions. This advantageously enables a user to update their consent information in the event that they now wish to dissent/consent to the use of a tracking tag for a particular purpose. This means a user is not required to be constrained to their initial choices.

In most embodiments the method includes receiving the set of available tracking tags from a data collector server.

In some embodiments the selecting step comprises: selecting from the plurality of available tags, a first available tracking tag where the purpose parameter of the available tracking tag corresponds to a specific purpose which has an indication of user consent in the corresponding tag-selection parameters; determining a second available tracking tag where the purpose parameter of the available tracking tag has no user consent or dissent; obtaining user consent or user dissent from the user for the second available tracking tag; and updating the associated set of tag-selection parameters of the second available tracking tag.

In some embodiments the transmitting step comprises transmitting the second available tracking tag to the domain owner server for deployment on the website if user consent has been obtained, at the same time as transmitting the first available tracking tag to the domain suite owner server. Alternatively in other embodiments the first available tracking tag is transmitted to the domain owner server for deployment on the website before the consent for the second available tag has been received.

According to another aspect of the present invention there is provided a tag delivery system for providing one or more selected tracking tags to a domain owner server for deployment on a website, the one or more tracking tags being selected from a set of available tracking tags, the system comprising: a tag data store for storing the set of available tracking tags, each available tracking tag including a purpose parameter describing a use to which data collected by the available tracking tag will be put; a selection parameter store for storing a plurality of user identifiers and a plurality of sets of tag-selection parameters, each user identifier identifying a website user and having an associated set of tag-selection parameters which identify a specific tracking tag and indicate whether a user consent has been obtained for a specific purpose of the specific tag; a tag request handler for receiving, from the domain owner server, a request for deployment of one or more tracking tags on the website, the request including a received user identifier identifying a user accessing the website; a tag selection processor configured, for a user identifier corresponding to the received user identifier, to compare the tag-selection parameters for each specific tracking tag to the purpose parameter of each corresponding available tracking tag; and to select available tracking tags where the purpose parameter of the available tracking tag corresponds to a specific purpose which has an indication of user consent in the corresponding tag-selection parameters; and a transmitter for transmitting the selected available tracking tags to the domain owner server for deployment on the website. The advantages of this system are the same as given above for the corresponding method aspect of the present invention.

BRIEF DESCRIPTION OF THE DRAWINGS

In order that the invention may be more readily understood, reference will now be made, by way of example, to the accompanying drawings in which.

DETAILED DESCRIPTION OF EXAMPLE EMBODIMENTS

Specific embodiments are now described with reference to the appended figures.

Figure 1:
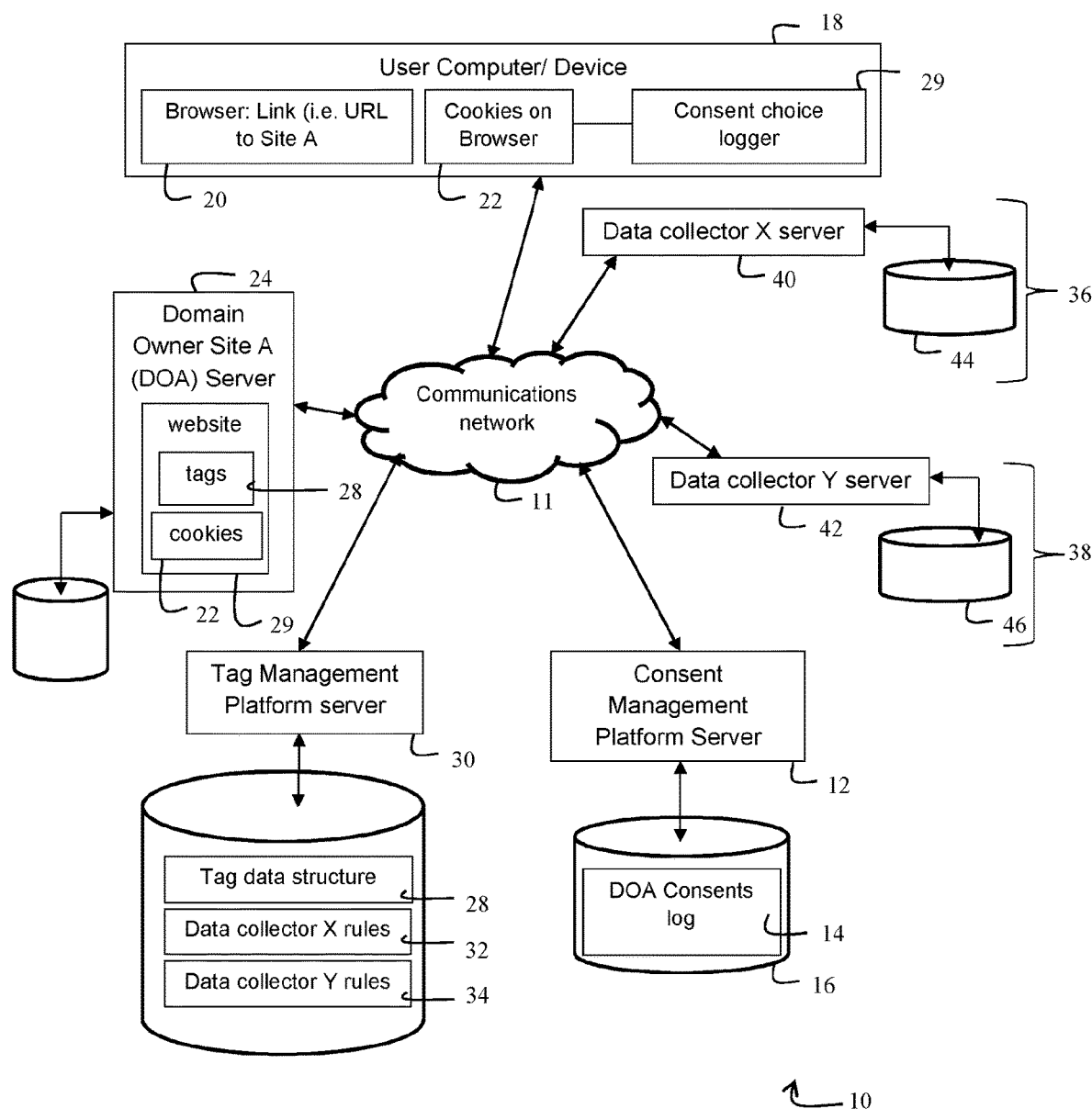
FIG. 1 is a schematic block diagram showing a known system for managing tags and consent preferences for a user when they interact with a website.
Figure 2:
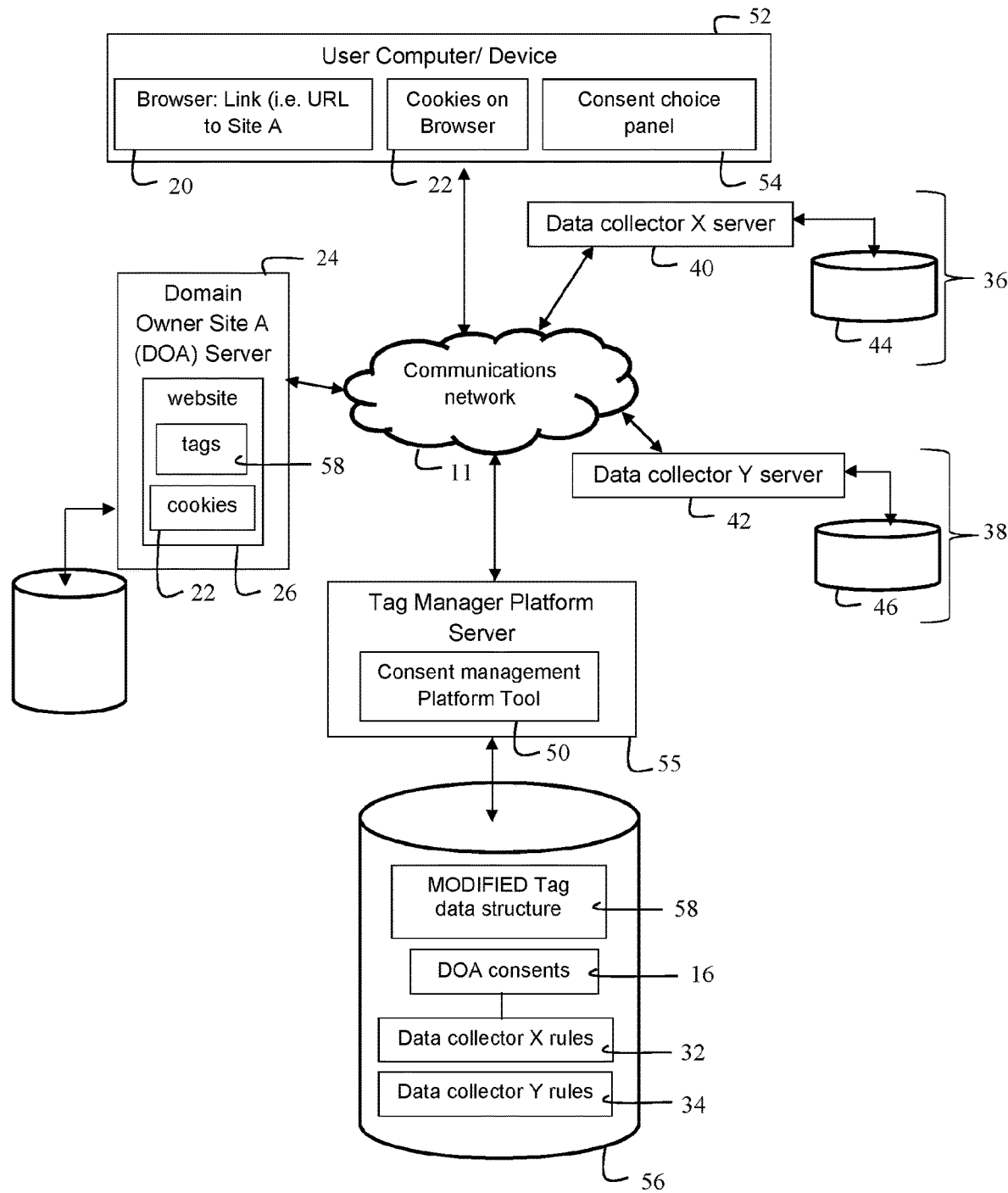
FIG. 2 is a schematic block diagram illustrating a consent management platform tool in accordance with an embodiment of the present invention in combination with a use scenario system for managing tags and consent preferences for a user when they interact with a website.

Turning firstly to FIG. 2, there is shown a use scenario for a consent management platform tool 50 according to a first embodiment of the present invention, which manages tags that are to be deployed on a website and the consents associated with these tags. The tags which the consent management platform tool 50 manages have a modified data structure when compared to the tags described with reference to FIG. 1. The modification to the data structure enables each individual tag to be associated with particular user consent for both the data collector 36, 38 that the tag relates to and the purpose for which the collected data is used. This consent association allows the consent management platform tool 50 to only deliver tags to be embedded in a website for which a user has given permission to be used. This is in contrast to the prior art which requires that all available tags are delivered and embedded in a website with consents being used by the data collectors subsequent to the delivery to decide which collected data may be used and retained. This delivery of only necessary and usable tags reduces the processing load when a webpage of the website is initially loaded and provides a more efficient running of the website as code for only those tags for which there is user consent run during user interaction with the website. No tags are loaded for which consent is required that has not been consented to by a user.

The consent management platform tool 50 operates in an environment which is the same as that described previously in relation to FIG. 1. In this regard and for the sake of brevity, the following description will only focus on the differences between the Prior Art 10 of FIG. 1 and of the current embodiment shown in FIG. 2. The environment includes the same data collector systems 36, 38 and domain owner server 24 infrastructures as described with reference to FIG. 1. The environment also includes a user computer/device 52 similar to the one described with reference to FIG. 1 as it includes both a browser 20 and cookies on the browser 22. However, whilst the user computer/device 18 of FIG. 1 contained a consent choice logger 28 which used the information included in the browser cookies 22 to note the consent choices made by the user, the user computer/device 52 of FIG. 2 instead features a consent choice panel 54. The differences between the consent choice panel 54 of FIG. 2 and the consent choice logger 28 of FIG. 1 will be discussed below with reference to FIG. 10. As above, although only one domain owner server 24 is shown, it is to be understood that this is for illustrative purposes only and there may be a plurality of website domains managed within such an environment.

As can be seen from FIG. 2, the consent management platform tool 50 replaces the consent management platform server 12 and tag management platform server 30 of FIG. 1. The consent management platform tool 50 acts as to perform the same functions of the two omitted components, namely to manage the tags which are embedded in a webpage and to capture the consents of the user of the website 26 regarding which data collectors can use information gathered by the tags, and for which purposes this information may be used. The consent management platform tool 50 is housed on a tag manager platform server 55. The tag manager platform server 55 communicates with the data collector systems 36, 38, domain owner server 24 and user computer/device 52 infrastructures via an external communications network 11. Such an external communications network 11 may comprise any network capable of supporting suitable wireless or wired communication methods, for example a wide-area network such as the Internet. The tag manager platform server 55 communicates with the data collector systems 36, 38, user computer/devices 52 and domain owner servers 24 to receive information regarding tags to be displayed at the website 26, as well as the consent of users regarding how information collected by these tags can be used. The information received by the tag manager platform server 55 is used by the consent management platform tool 50 in order to manage the tags and their associated consents.

The tag manager platform server 55 is communicatively coupled to a database 56 which is configured to store the tags which are to be delivered to the website webpages. As mentioned above, the tags which are stored have a modified tag data structure 58 compared to known tags. The modified tag data structure 58 includes information regarding the consent information associated with that tag for one or more end users. The data structure of known tags and modified tags are discussed in further detail below with reference to FIGS. 4A to 4C. The database 56 is also configured to store information relating to user consents 16 and rules 32, 34 relating to when the tags should collect data. This information may be stored analogously to how the consent information and rules are stored in the databases coupled to the consent management platform server 12 and tag management platform servers 30 of FIG. 1 respectively. It is to be understood that the terms "tag" and "modified tag data structure" may be used interchangeably herein when referring to the tag that is to be delivered to the website webpages and the tag information stored in the tag database 56.

The consent management platform tool 50 receives information regarding tags that are to be made available for deployment on a website 26 of a domain owner server 24 from data collector systems 36, 38. The information typically includes the data collector 36, 38 to which the tag relates. The information also includes the purpose that the information to be collected by the tag is to be used for. This may include for example purposes such as advertising, live chat, and product recommendations based on the information collected by the tag. In some embodiments, rather than being delivered directly by the data collector systems 36, 38, the information may be provided by a third party, such as the domain owner server 24. The information may be received in any suitable format such that the consent management platform tool 50 is able to create a modified tag data structure 58 in accordance with embodiments of the invention. The modified tag data structure 58 is then stored in the database 56 to be subsequently accessed. In some embodiments, the data collector systems 36, 38 may provide the tag information in the form of the modified tag data structure 58 to be used by the consent management platform tool 50. In these embodiments, the consent management platform tool 50 does not need to perform any further processing at this point following the receipt of the modified tag data structure 58 and it is immediately stored in the database 56 in accordance with embodiments described above.

The consent management platform tool 50 is additionally configured to receive requests from the domain owner server 24 to deploy tags within a website 26 which has been accessed by a user computer/device 52. When a user first accesses such a website 26, the website typically sends a request to the consent management platform tool 50 requesting that all tags which are available that a user has consented to the use of be deployed at the website. Available tags may comprise any tags which are present in the database 56. The consent management platform tool 50 then accesses the database 56 and retrieve any tags which it is determined the user has consented to for use, before providing these tags to be deployed in the website 26. In some embodiments, the modified tag data structure 58 for each tag in the database 56 may additionally comprise information relating to which websites the tag is to be made available for. In these embodiments, the consent management platform tool 50 only retrieves and provides those tags which are consented to by the user which relate to the website 26 being accessed.

In some cases, when the consent management platform tool 50 looks to retrieve tags which the user has consented to the use of, there will be no explicit consent information given, i.e. there will be no information saying that the tag can or cannot be used. This typically occurs when a user has not accessed the relevant website before, or a new tag has been added to the database 56 since the user's last access of the website. In this instance, the consent management platform tool 50 sends a request back to the website for user consent information for tags where consent information is not available. The consent management platform tool 50 then waits for this consent information before it is decided whether the relevant tag is to be provided to the website. In some embodiments of the present invention, the request for information is sent via a separate tag (a "consent prompt tag" 110—see FIG. 4C) to be embedded within the website, where this tag may be loaded in advance of all other tags. The purpose of this tag is to cause the deployment of a menu at the website 26 which the user interacts with in order to provide their consent. This menu may be displayed as the consent choice panel 54 included within a graphical user interface (GUI) described with reference to embodiments above, or by being embedded in the website itself. The consent prompt tag 110 of the present invention does not require user consent to be deployed, since it does not gather information regarding the user's behaviour on a website, and only acts so as to gather consent information for other tags. The way in which this may be achieved is discussed further below with reference to FIGS. 7A and 7B.

In some embodiments of the present invention, the website being accessed by the user computer/device 52 may also allow a user to manually update their consents regarding tags available for deployment in the website 26 for which consent (or lack thereof) has previously been supplied. This may be enabled through use of a menu (not shown) made available at the website and can be made available either in addition to or alternative to the consent prompt tag 110 described above. Where consents are modified, this information is supplied to the consent management platform tool 50 in order to update the modified tag data structure 58. The way in which this may be achieved is discussed further below with reference to FIG. 9.

Upon receipt of consent information in accordance with any of the embodiments described above, the consent management platform tool 50 accesses the relevant modified tag data structures 58 in the database 56 to which the consent 16 relates and updates the consent information stored within. The modified tag data structures 58 are then placed back in the database 56 to be accessed for subsequent deployment requests. In some embodiments, when parameters of the modified tag data structure 58 are updated in response to a user modifying their consent choices, the consent management platform tool 50 determines whether the modified tag data structures 58 should now be delivered to the website 26 in accordance with the updated information. For example, if a tag was previously given consent/denied consent (dissent) to be deployed, if a user decides to update this consent so that it may/may not be deployed, the consent management platform tool 50 then deploys/removes the updated tags to/from the website accordingly. The way in which this may be achieved is discussed further below with reference to FIG. 9.

The following description relates to systems and methods which are used to obtain consents from users of a website in relation to tags which may be deployed upon that website for the purpose of collecting data. A description of how the collected data is delivered to data collectors 36, 38 is not expanded upon in detail and occurs in accordance with known systems. However, the present invention enables the delivery of the data to data collectors 36, 38 without requiring that the data collectors 36, 38 filter information in accordance with provided consent information as is necessary in the prior art.

Figure 3:
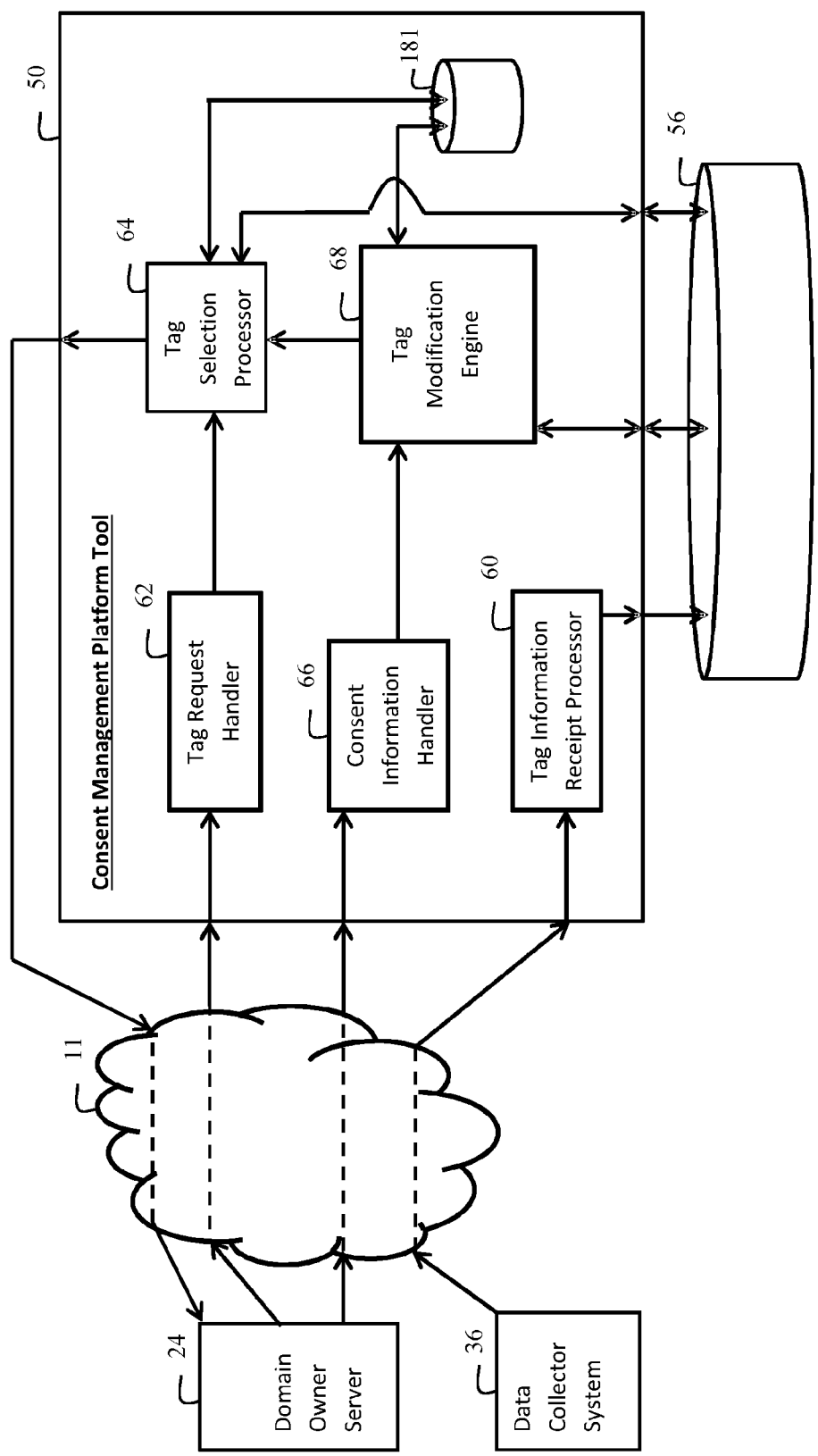
FIG. 3 is a schematic block diagram showing the consent management platform tool to be used in the system of FIG. 2.

Turning now to FIG. 3, the consent management platform tool 50 is described in more detail in accordance with a first embodiment of the invention. The consent management platform tool 50 receives and transmits data transmissions to the data collector systems 36, 38, domain owner server 24 and user computer/device 52 infrastructures via the external communications network 11 in accordance with embodiments described herein. This includes the receipt of requests from a domain owner server 24 to deliver tags to be embedded in the website 26 of the domain owner 24. The transmissions received by the consent management platform tool 50 may also include transmissions from the user computer/device 52 with information regarding the consent of a user regarding how and when the information collected by the tags can be used. The transmissions may additionally comprise requests from data collector systems 36, 38 to include new tags in the consent management platform tool 50 to be made available to a domain owner server 24 to deploy within a website at a subsequent point in time.

The consent management platform tool 50 comprises a tag information receipt processor 60 which receives information parameters regarding tags to be made available for deployment from a data collector system 36 via the external communications network 11. These information parameters may include the data collector source to which the data collected is to be made available, the purpose for which the collected data is to be used and any rules indicating when the tag should be "fired" (i.e. when it is to start collecting data). As discussed previously, whilst it is illustrated that these information parameters are provided by a data collector system 36 it is to be appreciated that any suitable source may provide these information parameters, such as the domain owner server 24. The tag information receipt processor 60 is configured to receive and process the information parameters which are received such that they are in a format suitable to be placed into the tag database 56 to which the tag information receipt processor 60 is operatively coupled. This processing typically includes modifying the structure of the received information parameters such that they take the form of a modified tag data structure 58 which additionally includes parameters indicating the consent of the user for use of that tag. In alternative embodiments, the data collector system 36 (or other information source) may be configured to provide information parameters in the form of the modified tag data structure 58. In this case, the tag information receipt processor 60 does not modify the format of the information parameters and simply places the received information parameters into the tag database 56.

When the modified tag data structure 58 is first created (either by the tag information receipt processor 60 or the source that provides the tag information parameters, such as the data collector systems 36, 38), the consent parameters 100 are typically not provided, since no consent information parameters are likely to be determined. This parameter is provided and the corresponding data structure field filled upon subsequently receipt of consent information from a user. The modified tag data structure 58 is described in more detail below with reference to FIG. 4B. In FIG. 3, for the purposes of clarity, only one data collector system 36 is shown. However it is to be understood that a plurality of data collector systems 36, 38 (or other suitable information sources) may transmit information to the consent management platform tool 50 and these instructions may be handled by the consent management platform tool 50 simultaneously, in parallel, according to an embodiment of the present invention.

As the information is received via the external communications network 11, it is conceivable that the information parameters may undergo some form of data corruption as they are being transmitted, or that the data collector system 36 does not provide all of the information parameters necessary to create a modified tag data structure 58 (for example, there may be no information parameters provided regarding when the tag is to fire). In some embodiments of the present invention, the tag information receipt processor 60 is additionally configured to verify the veracity and integrity of the received information and only process the received information if the data is complete and uncorrupted. Where the veracity and integrity of the information is not sufficient to allow the information to be processed, the tag information receipt processor 60 is configured to notify the data collector system 36, which supplied the initial information, that the tag is unable to be placed in the database 56 for deployment.

The consent management platform tool 50 additionally comprises a tag request handler 62 which receives requests for available tags to be deployed in the website 26 via the external communications network 11 from the domain owner server 24. The tags, which are requested for deployment, are typically those which have previously been placed in the tag database 56 in accordance with embodiments described above. The request for tag deployment typically occurs when a user accesses a website 24 and the website is loading. The tags identified for deployment are then embedded in the website 24 to be used for data collection as described above. The tags which are identified for deployment typically comprise those tags which are present in the tag database 56 and whose use has been consented to by the user.

The tag request handler 62 is configured to receive and process the requests such that they are in a suitable format to be processed by the consent management platform tool 50 in order to retrieve and deliver the appropriate tags back to the domain owner server 24 that provided the original request. The processing of the request may comprise determining whether the provided request contains sufficient information to enable tags to be delivered to the website 26. For example, this may comprise an identification of the website which is requesting the tags, and information which enables the user of the website to be identified in order to ascertain the relevant user consent information to determine whether a tag should be deployed.

In some embodiments of the present invention (not shown in the accompanying figures), prior to a domain owner server 24 providing request for tags to the consent management platform tool 50, a specialised tag (a "consenTag") may be provided to the domain owner server 24 and stored on the domain owner server 24. In these embodiments, the consenTag may be configured to be loaded by the domain owner server 24 every time a website 26 of the domain owner server 24 is accessed by a user computer/device 52. Since the consenTag is stored on the domain owner server 24, this tag does not need to be delivered by the consent management platform tool 50. The consenTag may be configured to provide a request for tags to be deployed to the consent management platform tool 50. To achieve this, the consenTag may comprise instructions which are configured to supply the consent management platform tool 50 with the required information to allow tags to be delivered to the domain owner server 24 in accordance with embodiments described above. For example, this may comprise an identification of the website which is requesting the tags, and information which enables the user of the website to be identified in order to ascertain the relevant user consent information to determine whether a tag should be deployed. In further embodiments, this consenTag may be provided to the domain owner server 24 by the consent management platform tool 50 upon request, where the consent management platform tool 50 is configured to provide this tag.

As with the information being transmitted by the data collector system 36, since the tag requests are received via the external communications network 11, it is conceivable that the requests may undergo some form of data corruption as they are being transmitted, or that the domain owner server 24 did not provide all of the necessary information to process a request (for example, there may be no information provided regarding the identification of the user who has accessed the website). In some embodiments of the present invention, the tag request handler 62 is additionally configured to verify the veracity and integrity of the received information and only process the received information if the data is complete and uncorrupted. Where the veracity and integrity of the information is not sufficient to allow the request to be processed, the tag request handler 62 is configured to notify the domain owner server 24, which supplied the initial request, that the request is unable to be processed and that tags cannot be deployed in the website.

Once a request has been processed by the tag request handler 62, the request is passed on to a tag selection processor 64 which is coupled to the tag request handler 62. The tag selection processor 64 is configured to use the information provided in the tag deployment request to identify the website 26 upon which the tags are to be deployed, the user computer/device 52 which accessed the website, and subsequently determine which of the tags in the tag database 56 (which is coupled to the tag selection processor 64) should be deployed in the website 26. This may be achieved by first determining the website and user identification parameters included in the provided request and comparing these to the corresponding parameters in the modified tag data structures 58 in the tag database 56. The tag selection processor 64 then determines which of the available tags for that website 26 have consent to be deployed for that particular website by referencing the consent information parameters of each of the tags. The tag data structure parameters are discussed further below with reference to FIG. 4B. The tag selection processor 64 then retrieves the tags that have been selected for deployment and delivers these tags to the domain owner server 24 via the external communications network 11. The tag selection processor 64 may deliver each of these tags individually as they are determined to be selected for deployment. Alternatively, the tag selection processor 64 may queue each of the selected tags until it is determined that there are no more tags to be selected for deployment, and transmit each of these tags in a single transmission to the domain owner server 24 for a more efficient communication protocol.

The consent management platform tool 50 further comprises a pseudonymous user ID database 181 to which the tag selection processor 64 is operatively coupled. The pseudonymous user ID database 181 is configured to store the user identification information with a corresponding pseudonymous user ID. This will be described in more detail below with reference to FIG. 6.

As described above, the consent management platform tool 50 of the present invention uses a pseudonymous identification scheme which does not specifically identify a user. Rather the identification relates to the unique identification of a particular browser being used by an end user to access the website 26 at a particular location, and the consent management platform tool 50 manages the consent of this particular browser. A single user may use a plurality of different browser (for example, using a particular browser on a personal computer and using a different browser on a mobile device). The consent management platform tool 50 maybe configured to manage the consents of each browser separately. Alternatively, the consent management platform tool 50 may also manage the browsers of a single user as a single ID, with the same consents being applied to each browser. This may be achieved by appropriate use of triangulation data points, described below. A benefit of using a pseudonymous identification scheme is that it enables a user to be uniquely "identified," without actually providing any personal information regarding the user. Rather, the identity of the user can be expressed as a set of disparate data points which offer the user a unique identity. Whilst this pseudonymous scheme is utilised, it is to be appreciated that alternate embodiments of the present invention may not use this pseudonymous scheme, and instead the user may be uniquely identified through the provision of personal information (such as a full IP address). For the remainder of this description, it is to be assumed that the pseudonymous scheme is to be used and the user identification will be referred to as such. However, the pseudonymous user identification may be replaced with personal detail derived user identification through appropriate modification of the consent management platform tool 50.

The tag selection processor 64 is also configured to determine whether any of the modified tag data structures 58 in the tag database 56 are missing consent information. This may be performed as the tag selection processor 64 references the consent information parameters of the available tag data structures and may comprise determining that the consent information parameter is empty. If it is determined that the consent information is missing, the tag selection processor 64 is configured to create a request for the missing consent information which is to be sent to the domain owner server 24 in order to obtain feedback in the form of the user's consent preferences. The request contains sufficient information to enable the domain owner server 24 to identify the data collector system 36 which is collecting the information from the relevant tag, and the purpose that the data collected by the relevant tag is used for. The tag selection processor 64 may deliver each of these requests individually as each tag the request relates to is determined to be missing consent information. Alternatively, the tag selection processor 64 may queue each of the requests until it is determined that there are no more tags which have missing consent information parameters, and transmit each of these requests in a single transmission to the domain owner server 24 to increase efficiency of communication.

In some embodiments of the present invention, the request for consent information itself may comprise a tag to be deployed in the website of the domain owner server 24. This tag (hereby known as a "consent prompt tag" 110) may itself be included in the tag database 56 and is retrieved when the tag selection processor 64 retrieves tags from the tag database 56. In these embodiments, the tag data structure of the consent prompt tag 110 is slightly different to the tag data structures of tags provided by the data collector system 56. The consent prompt tag contains sufficient information parameters that enable each available tag which is missing this information to be identified, and enables this information to be obtained by a user when the tag is deployed in the website of a domain owner server 24. The consent prompt tag 110 is typically deployed in advance of any other tags to be deployed in the website. In some embodiments of the present invention, the consent prompt tag is delivered simultaneously to other tags which are determined to have the appropriate user consent to be deployed. The tag data structure of the consent prompt tag 110 is discussed in further detail below with reference to FIG. 4C.

The consent management platform tool 50 additionally comprises a consent information handler 66 which receives consent information from a user relating to the use of available tags in the tag database 56 via the external communications network 11. This may be provided in the form of an instruction to update and modify the existing consent information. The consent information/instruction may be provided directly from the user computer/device 52. Alternatively, the user computer/device 52 may provide the consent information to the domain owner server 24 which subsequently provides the information to the consent information handler 66 via the external communications network 11. The provision of the consent information typically occurs when it has previously been determined by the consent management platform tool 50 that one or more of the tags in the tag database 56 have no associated consent information and a request for this information has been sent to the domain owner server 24, in accordance with embodiments described above. In some embodiments of the present invention, the consent information may be provided when a user wishes to update existing consent information, where this functionality is provided by the domain owner server 24 at the website 26. In this case, the update may be provided in the form of an instruction to modify the existing consent information.

The consent information supplied via the external communications network 11 typically provides information which identifies a particular tag for which the consent information is being provided, and information regarding the consent of the user, as well as information which enables the identification of the user. The consent management platform tool 50 then utilises this information to update the information parameters of the modified tag data structure 58 stored in the tag database 56. The information may be supplied in any format which enables the consent management platform tool 50 to update the modified tag data structure 58 in such a manner. The received information may relate to a single modified tag data structure 58 in the tag database 56. Alternatively, the received information may comprise of an information packet which relates to multiple modified tag data structures 58 simultaneously. This may typically occur when a user accesses a website with a plurality of available tags for the first time, meaning that consent information for each of the plurality of available tags needs to be provided.

As with other information which is provided via the external communication network 11, it is possible that the consent information provided may undergo some form of data corruption as they are being transmitted or that the supplied information is incomplete for the purposes of updating the modified tag data structures 58 in the tag database 56. In some embodiments of the present invention, the consent information handler 66 is additionally configured to verify the veracity and integrity of the received consent information and only process the received consents if the data is complete and uncorrupted. Where the veracity and integrity of the consent information is not sufficient to allow the information to be processed, the consent information handler 66 is configured to notify the supplier of the consent information that the information is unable to be processed and that the relevant modified tag data structures 58 cannot be updated with the new consent information.

Once the consent information has been processed by the consent information handler 66, the consent information is passed onto a tag modification engine 68 which is coupled to the consent information handler 66. The tag modification engine 68 is responsible for retrieving, updating and replacing the modified tag data structures 58 that the received consent information relates to. This is achieved by first determining the identification of the user to which the consent relates. More specifically, identification may be determined by the provision of a unique identifier, such as a static IP address, by the supplier of the consent information. In some embodiments, the identification information may be provided via the use of information stored in a cookie 22 on the user computer/device 52 through methods known in the art. In further embodiments, this information may be provided via the use of a triangulation technique, which utilises separate non identifying triangulation data points to ascertain the location from which the consent information has been provided. The use of such a triangulation technique enables the user to be identified even if cookies 22 stored on the user computer/device 52 containing identification information have been deleted. Additionally, such a triangulation technique may enable the unique identification of the user to which the consent relates without requiring personal information regarding the user (such as an IP address) to be supplied. This helps to maintain the anonymity of the user and minimises the need for the dissemination of their personal details. Further information regarding the use of this triangulation method will be given below with reference to FIG. 6. In order to help identify the user, the tag modification engine 68 is also operatively coupled to the pseudonymous user ID database 181 referred to above. Details regarding how the pseudonymous user ID database 181 is used for this purpose are given below with reference to FIG. 8.

Following the determination of the identification of the user supplying their consent, the tag modification engine 68 then proceeds to determine which of the modified tag data structures 58 stored in the tag database 56 the received consent information relates to. The tag modification engine 68 is operatively coupled to the tag database 56 storing all of the available modified tag data structures 58. The determination of the relevant modified tag data structures 58 is achieved by comparing the information identifying the tag provided in the consent information received via the external communications network 11 to the corresponding information in the modified tag data structures 58. In some embodiments, this is achieved by the tag modification engine 68 sending a retrieval request to the tag database 56 with tag identification parameters which match the information supplied. The corresponding modified tag data structure 58 is then accordingly retrieved. In other embodiments, this is achieved by retrieving each of the available modified tag data structures 58 in the tag database 56, with the tag modification engine 68 comparing each of the retrieved modified tag data structures 58 in turn to determine which matches the tag specified in the consent information supplied. The modified tag data structures 58 which do not match are then placed back in the tag database 56.

Once the correct modified tag data structure 58 has been identified and retrieved from the tag database 56 in accordance with the above embodiments, the tag modification engine 68 proceeds to update this modified tag data structure 58 with the consent information. This is achieved by appending the consent information supplied to the modified tag data structure 58 as an information parameter. In cases where no previous consent information has been supplied, this consists of filling the blank information parameter field with the consent information. In cases where the consent information parameter field already has a value assigned to it, the appending of the information comprises overwriting the existing value with the new value (where necessary). If the newly supplied consent information matches the previous value, no further action is taken. Once the information has been appended to the modified tag data structure 58 to create the updated modified data structure in accordance with the above, the tag modification engine 68 proceeds to overwrite previous the modified tag data structure 58 in the tag database 56 with the updated tag data structure 58 such that the updated tag data structure 58 is available for further subsequent retrieval.

In some embodiments of the present invention, the tag modification engine 68 is additionally coupled to the tag selection processor 64. In these embodiments, when the consent information parameter of one or more modified tag data structures 58 has been updated, the tag modification engine 68 sends a notification of this to the tag selection processor 64. This notification includes an identification of the one or more modified tag data structures 58 that have been updated. The notification indicates to the tag selection processor 64 that the consent information regarding a tag which may be made available to a website being viewed by a user has changed, which may change whether or not that tag can be deployed in the website in accordance with the user's consent. This enables the tag selection processor 64 to provide tags in accordance with the user's real-time consent information.

Figure 4A:
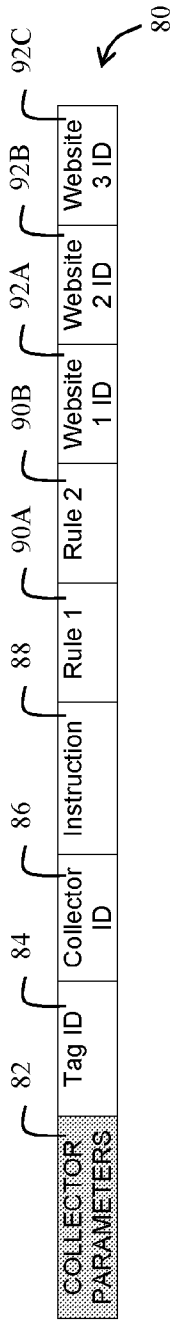
FIG. 4A is a schematic block diagram, showing an example of a tag data structure of the prior art.

Referring now to FIG. 4A, there is shown an example of a tag data structure 80 in accordance with known (prior art) systems which can be sent by data collector systems 36, 38 to known tag management platform servers 30 to be placed on domain owner server 24 websites. This known tag data structure contains sufficient information to allow the known tag management platform servers 30 to determine where a tag should be placed on a website 26, what the tag is configured to do once it is placed (i.e. what information should be collected) and under what circumstances the tag should fire (i.e. a set of rules). This known tag data structure 80 does not contain any information regarding what purpose the collected information is used for, nor any information regarding whether a user has consented to the use of the tag. These purpose and consent issues are typically managed by the data collector systems 36, 38 and a separate consent management platform server 12 in accordance with embodiments described above. The known tag data structure 80 typically comprises a set of information parameters which are used to encapsulate the information described above.

The information parameters of the known tag data structure 80 comprise a set of collector parameters 82. These collector parameters 82 are information parameters specified by the data collector systems 36, 38 or equivalent intermediaries and are provided to the known tag management platform servers 30 to allow the corresponding tags to be deployed on domain owner server websites 26.

The collector parameters 82 of the prior art comprise a unique tag ID 84 which enables the tag to be identified by appropriate systems which wish to access and deploy the tag (such as the domain owner server 24). The collector parameters 82 further comprise a unique collector ID 86 which identifies the data collector system 36, 38 that the data collected by the tag should be delivered to. The collector parameters 82 yet further comprise instructions 88 that the tag is coded to execute when deployed on a website and when instructed to fire. These instructions 88 may comprise instructions for which information should be collected. The collector parameters additionally comprise one or more rules 90A, 90B which provide the tag with conditions and logic indicating when the tag should be fired and the instructions 88 which are to be executed. Whilst two rules 90A, 90B are shown, it is to be understood that this is for illustrative purposes only, and that any number of rule parameters 90A, 90B may be provided relating to as many rules as necessary to determine when the tag should be fired. The collector parameters 82 yet further comprise one or more website IDs 92A, 92B, 92C which identify which websites the tag should be deployed at when the relevant website is loaded. Whilst three website IDs 92A, 92B, 92C are shown, it is to be understood that this is for illustrative purposes only, and that any number of website IDs 92A, 92B, 92C may be provided relating to as many rules as necessary to determine when the tag should be fired.

Figure 4B:
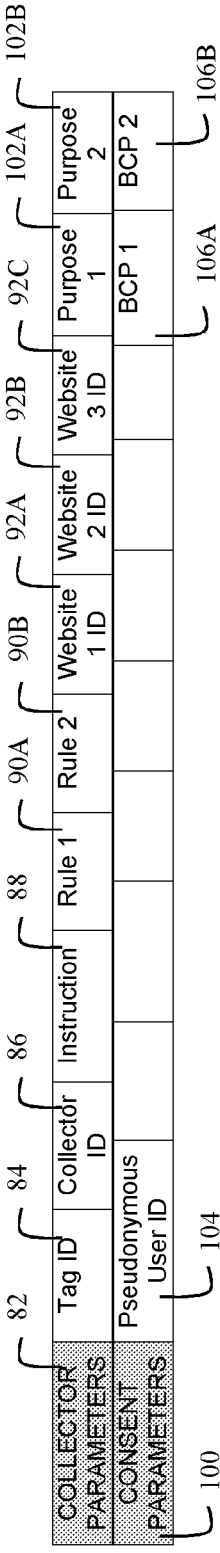
FIG. 4B is a schematic block diagram, showing an example of a tag data structure to be used in conjunction with the consent management platform tool of FIG. 3.

Turning now to FIG. 4B, there is shown a modified tag data structure 58 in accordance with an embodiment of the present invention. As with the known tag data structure 80 described above with reference to FIG. 4A, the modified tag data structure 58 contains sufficient information to allow the known tag management platform server 55 to determine where a tag should be placed on a website 26, what the tag is configured to do once it is placed (i.e. what information should be collected) and under what circumstances (conditions and logic) the tag should fire. However, the modified tag data structure 58 also contains information indicating what the information collected by the tag is used for (i.e. its purpose). Additionally, the modified tag data structure 58 is configured to contain information regarding whether a user has consented to the tag collecting data for a particular purpose. In this way, it is possible to determine from the modified tag data structure 58 whether the user has consented to the collection of information from the user prior to the tag being deployed on a website. Where the required consent is missing, the tag is not deployed.

The information parameters of the modified tag data structure 58 comprise both collector parameters 82 (as with the known tag data structure 80), and additionally consent parameters 100. Broadly speaking, the collector parameters 82 of the modified tag data structure 58 comprise the same information parameters as those in the known tag data structure 80 (shown in FIG. 4A) and are provided by the data collector systems 36, 38 or equivalent intermediaries. The consent parameters 100 relate to additional information parameters indicating the consent of a user to the tag being used. These consent parameters 100 are ultimately provided by the user to whom the consent relates. In some embodiments, the consent parameters 100 may also be provided by a third party that has been previously provided with the consent information. This may be the case where a user has already provided consent relating to the use of this tag on a different website of a different domain owner server 24, and where this information has been shared between two domain owner servers in accordance with the user's consent.

The collector parameters 82 of the modified tag data structure 58 comprise a unique tag ID 84 which enables the tag to be identified by appropriate systems that wish to access and deploy the tag (such as the domain owner server 24). The unique tag ID 84 may be provided by the data collector, or may be assigned by the consent management platform tool 50 when the tag information parameters are received. The collector parameters 82 further comprise a unique collector ID 86 which identifies the data collector system 36, 38 that the data collected by the tag should be delivered to. As above, the unique collector ID may be provided by the data collector, or may be assigned by the consent management platform tool 50 when the tag information parameters are received. The collector parameters 82 yet further comprise instructions 88 that the tag is coded to execute when deployed on a website and when instructed to fire. These instructions 88 may comprise instructions for which information should be collected. The collector parameters additionally comprise one or more rules 90A, 90B which provide the tag with conditions and logic indicating when the tag should be fired and the instructions 88 executed. Whilst two rules 90A, 90B are shown, it is to be understood that this is for illustrative purposes only, and that any number of rule parameters 90A, 90B may be provided relating to as many rules as necessary to determine when the tag should be fired. For example, a list of events can be provided (e.g. pageload or specific browser navigation action) and logic representing those events such as 'execute every time' or 'only when condition A is also true'. The collector parameters 82 yet further comprise one or more website IDs 92A, 92B, 92C which identifies for which websites (also known as 'location') the tag should be deployed when the relevant website is loaded. Whilst three website IDs 92A, 92B, 92C are shown, it is to be understood that this is for illustrative purposes only, and that any number of website IDs 92A, 92B, 92C may be provided relating to as many rules as necessary to determine when the tag should be fired. The above information parameters function in an analogous way to those of the prior art data structure 80.

The collector parameters 82 of the modified tag data structure 58 further comprise one or more purpose fields (purposes) 102A, 102B indicating what the information to be collected by the tag is to be used for. Whilst two purposes 102A, 102B are shown, it is to be understood that this is for illustrative purposes only, and that any number of purposes 102A, 102B may be provided relating to as many purposes as provided by the data collector systems 36, 38.

The consent parameters 100 of the modified tag data structure 58 are typically left empty when the modified tag data structure 58 is first created, since at creation, the user will not have provided any consent regarding the tag. These parameters are then populated once user consent is received, in accordance with embodiments described herein.

The consent parameters 100 of the modified tag data structure 58 comprise a unique pseudonymous user ID 104 identifying the user to whom the consents relate. The identification of the user is determined in accordance with the embodiments described herein. In some embodiments, the pseudonymous user id parameter 104 may comprise user identification information such as a static IP address, cookie information or triangulation data points in accordance with embodiments described herein. The consent parameters 100 of the modified tag data structure 58 additionally comprise binary consent parameters (BCPs) 106A, 106B which indicate whether a user has consented to the use of the tag that the modified tag data structure 58 relates to. The binary consent parameters 106A, 106B typically notify a binary choice of yes or no to the use of the tag. In some embodiments of the present invention, there is only provided one binary consent parameter 106A which provides unilateral consent over the use of the tag for all purposes. In further embodiments of the invention, a binary consent parameter 106A, 106B is provided for each purpose 102A, 102B that collected information can be used for as designated by the tag. In the embodiment shown in FIG. 4B, there are shown two purposes 102A, 102B and two binary consent parameters 106A, 106B which are linked to these parameters. This embodiment enables greater control over the use of the tag, allowing it to be deployed for a particular purpose 102A, 102B, whilst denying its use for other purposes, as opposed to a tag being unilaterally denied use even though the user may consent to its use for particular purposes.

In some embodiments (not shown in the accompanying figures), a single modified tag data structure 58 may comprise a plurality of sets of consent parameters 100 in accordance with embodiments described above relating to the consents of multiple users of the tag. In these embodiments, rather than a modified tag data structure 58 being duplicated and supplied for each user that accesses the website of the domain owner server 24, a single modified tag data structure 58 is provided with one set of collector parameters 82. The plurality of sets of consent parameters 100 each relate to a different user and have a separate pseudonymous user id 104 and set of binary consent parameters 106A, 106B, each being provided by a separate user in accordance with embodiments described above.

In some embodiments (not shown in the accompanying figures), for each website ID 92A, 92B, 92C, there will be included a separate set of binary consent parameters 106A, 106B relating to the consent of the use of that tag for a purpose 102A, 102B by a data collector 36, 38 on each of the website. This may enable a user to indicate that the use of a tag for a particular purpose may be consented to on a particular website 26, but not on another. In further embodiments, the modified tag data structures 58 may further include a domain owner server 24 parameter, with each domain owner server 24 parameter comprising separate website ID sub-parameters 92A, 92B, 92C. Each of these website ID sub-parameters 92A, 92B, 92C may also include a separate set of binary consent parameters 106A, 106B in accordance with embodiments described above. In these embodiments, a single tag data structure 58 may be used to determine consent for a plurality of domain owners and, where the domain owners control a plurality of websites, determine consent for each of these in turn. This may be useful in preventing unnecessary duplication of tag data structures 58.

Figure 4C:
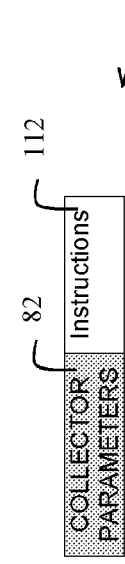
FIG. 4C is a schematic block diagram, showing an example of a tag data structure of a consent prompt tag to be used in conjunction with the consent management platform tool of FIG. 3.

Referring now to FIG. 4C, there is shown a consent prompt tag 110 in accordance with embodiments of the invention described above. The consent prompt tag 110 is a special form of tag which is configured to obtain consents of a user regarding the use of the modified tag data structures 58 noted above. Consent prompt tags 110 are stored in the tag database 56 and are configured to be deployed in the website of a domain owner server 24 when it is determined that binary consent parameters 106A, 106B are undefined for one or more modified tag data structures 58 that may be deployed upon a website 26 when that website is accessed by a user (in accordance with the website IDs 92A, 92B, 92C of the modified tag data structure 58).

The consent prompt tag 110 has a much simpler construction than the modified tag data structure 58 and comprises instructions 112 that the tag is coded to execute when deployed on a website and when instructed to fire. These instructions 112 comprise code which initiates a consent collection process at the website upon which the tag is to be deployed in accordance with embodiments described herein. The instructions 112 may also comprise an identification of the one or more tags for which consent is required and where the collected information is to be delivered to. There is no explicit need for rules indicating when this tag should fire since the tag is configured to fire upon deployment (as it is only deployed once certain conditions have already been met, namely the presence of undefined binary consent parameters 106A, 106B in a modified tag data structure 58 that may be deployed). The collected consent information is then provided to the consent management platform tool 50 in order to update the relevant modified tag data structure 58 accordingly.

Figure 5A:
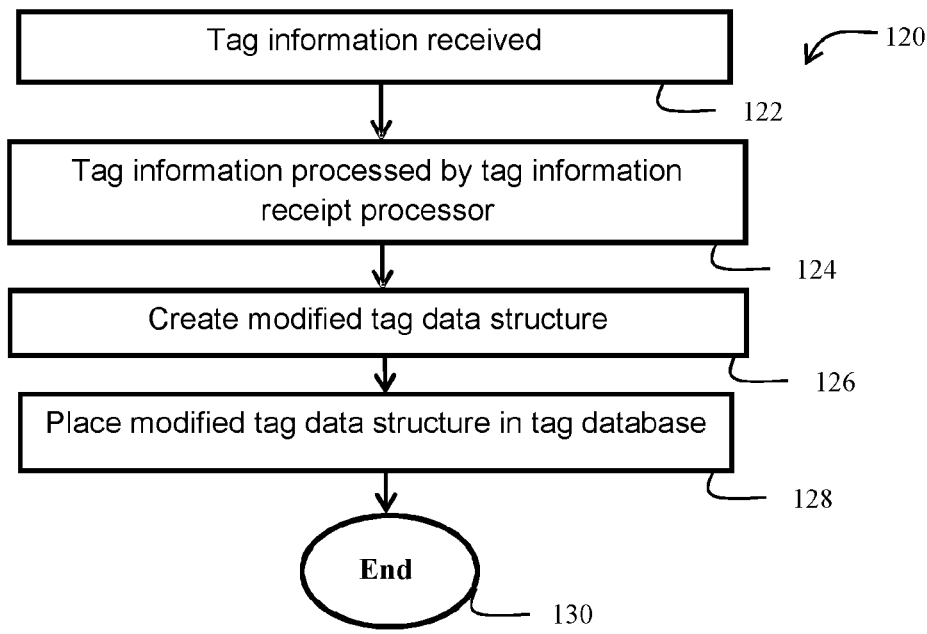
FIG. 5A is a flow diagram showing a method of operation of the consent management platform tool of FIG. 3 relating to the receipt of tag information from a data collector system.

Referring now to FIG. 5A, there is shown in detail a tag loading operation 120 of the consent management platform tool 50. Specifically, FIG. 5A shows the tag loading operation relating to the receipt of tag information from a data collector system 36 to be placed in the tag database 56. The tag loading operation 120 begins by receiving, at Step 122, information parameters regarding tags to be made available for deployment from the data collector system 36 via the external communications network 11. The information parameters are received by the tag information receipt processor 60. Following the receipt of the information parameters, the received parameters are processed, at Step 124, by the tag information receipt processor 60. This processing may comprise any one or more of ensuring that the information parameters are in a suitable format to be placed in the tag database 56, assigning unique tag and/or unique collector IDs to the received instruction parameters and verifying the veracity and integrity of the information parameters to ensure that the information parameters can be placed in the tag database 56 and subsequently retrieved and deployed in the website 26 of a domain owner server 24. In some embodiments, if it is determined that the veracity and integrity of the information parameters is not complete, then the tag loading operation 120 may include a further step of notifying the source of the information of this fact and that the tag cannot be placed in the tag database 56.

Following the processing of the information parameters, the tag loading operation 120 continues by creating, at Step 126, by creating a modified tag data structure 58 in accordance with the embodiments described above. This may be achieved by utilising the received information parameters and creating a record of the form of the modified tag data structure 58 (for example shown in FIG. 4B), or any form which is able to achieve the aim of the present invention to manage tag deployment and consent within a single system. Once the modified tag data structure 58 is created, the tag loading operation proceeds to place, at Step 128, the created modified tag data structure 58 in the tag database 56 for retrieval at a subsequent time. Following this step, the tag loading operation 120 proceeds to end at Step 130.

The above tag loading operation 120 describes the receipt of information relating to the placing of a single modified tag data structure 58 in the tag database 56. However it is to be appreciated that the consent management platform tool 50 may receive information relating to a plurality of modified tag data structures 58 simultaneously, either from the same data collector system 36 or multiple data collector systems 36, 38. The described tag loading operation 120 may be modified in such a manner that each of the modified tag data structures 58 may be created in series or in parallel, following the method steps given above. Where the plurality of modified tag data structures 58 are created in series, the consent management platform tool 50 may queue the received information and process each in turn in accordance with the tag loading operation 120. Where the plurality of modified tag data structures 58 are created in parallel, separate tag information receipt processors 60 may be employed to process each set of information parameters simultaneously in accordance with the tag loading operation 120.

In some embodiments of the present invention, the loading of a tag may be achieved by manually loading the tag information into a modified tag data structure 58 and loading this into the tag database 56. In these embodiments, one more of the steps described in the method of operation 120 may be omitted. For example, the information may be provided to the tag information receipt processor 60 by a source other than a data collector system 36, 38 (such as by the domain owner server 24). In this case, Step 122 is omitted and the operation 120 begins when the information from the alternative source is received by the tag information receipt processor 60. Additionally, if the modified tag data structure 58 is loaded directly into the tag database 56, then the tag loading operation 120 may be entirely bypassed and the loading is achieved by directly placing the modified tag data structure 58 into the tag database 56.

Figure 5B:
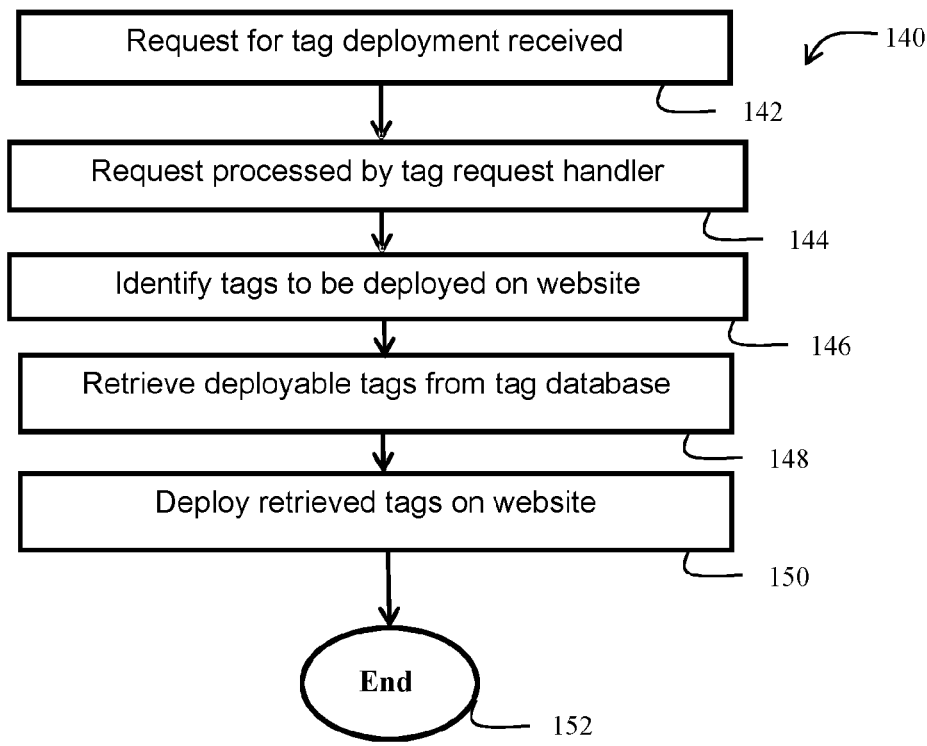
FIG. 5B is a flow diagram showing a method of operation of the system of FIG. 2 relating to the receipt of a tag deployment request from a domain owner server.

Referring now to FIG. 5B, there is shown in detail a tag deployment operation (method) 140 of the consent management platform tool 50. Specifically, FIG. 5B shows the tag deployment operation relating to the receipt of a request to deploy tags in the website of a domain owner server 24. The tag deployment operation 140 begins by receiving, at Step 142, a request for tags to be deployed in the website 26 of a domain owner server 24. This request for tags is received by the tag request handler 62 via the external communications network 11. Following the receipt of the request to deploy tags, the received request is processed, at Step 144, by the tag request handler 62. This processing may comprise determining whether the provided request contains sufficient information to enable tags to be delivered to the requested website in accordance with embodiments described above. This information may include information relating to identification of the user accessing the website and the website being accessed. This processing may additionally comprise verifying the veracity and integrity of the tag request to ensure that the request can be processed by the consent management platform tool 50.

Once the tag request has been processed, the tag deployment operation 140 continues by identifying, at Step 146, tags in the tag database 56 that can be delivered and deployed in the website accessed by the user based on consent preferences. Such identification is achieved by comparing the information provided in the tag request to the modified tag data structures 58 in order to determine which tags are available to be deployed on that website 26. This determination comprises an analysis of the pseudonymous user identification information provided in the request in order to determine the user's identity. This may be achieved in accordance with embodiments described herein. The determination additionally comprises an analysis of the consent parameters 100 in the modified tag data structures 58 in order to determine whether the identified user has consented to the use of the tag. Where the user has consented to the use of the tag, the tag may be deployed. Where no such consent is proffered, the tag is not deployed. In some embodiments, some of the modified tag data structures 58 in the tag database 56 are configured to only be made available to certain websites and contain information parameters indicating these websites. In these embodiments, determining which tags may be deployed comprises comparing the website information provided in the tag request to these information parameters in the tags and only allowing those which match to be deployed. Further information regarding the determination of which tags are to be deployed is provided with reference to FIG. 6 below.

The determination of which tags are to be deployed in the website 26 also comprises identifying modified tag data structures 58 in the tag database 56 for which relevant consent parameters 100 are undefined. For example, if a modified tag data structure 58 is available for deployment in the website but the identified user has not indicated whether or not they consent to the use of the corresponding tag by a particular data collector for a particular purpose, the consent parameters have no value assigned to them. It would therefore not be possible to determine whether this tag can be deployed. In these scenarios, the determination of which tags are to be deployed in the website additionally comprises requesting consent information for that user relating to the use of that tag. This request may be included in the form of a pop up window appearing on a browser of the user computer/device 52. This pop up window may further comprise the consent choice panel 54 in accordance with embodiments described above. The receipt of this information then enables the consent management platform tool 50 to determine whether the relevant tag is able to be deployed in accordance with the method of operation 140. Further information regarding how this is achieved is given with reference to FIG. 6 below.

Once the tags to be deployed have been identified at Step 146 based on the modified tag data structure and consent preferences, the tag deployment operation 140 proceeds to retrieve, at Step 148, the identified tags from the tag database 56. This may comprise retrieving sufficient information from the identified modified tag data structures 58 which allow the tag to be deployed and executable at the website, such as the instruction 88 and the rules 90A, 90B dictating when the tag should be fired. It is to be appreciated that whilst in the illustrated tag deployment operation 140, the retrieval of the identified tags occurs subsequently to the identification of all tags to be deployed, it is possible that once a tag has been identified for deployment the information for that tag may be immediately retrieved. Once the tag information has been retrieved, the tag deployment operation 140 proceeds by deploying, at Step 150, the identified tags to the website of the domain owner server 24. Again, it is to be appreciated that this step may occur as soon as a single tag has been identified and its information retrieved, rather than wait for the identification and retrieval of information of all tags to be deployed. Following this deployment step, the tag deployment operation 140 end at Step 152.

The above tag deployment operation 140 is typically followed once the consent management platform tool 50 has previously received tag information from a data collector 36, 38 and has stored modified tag data structures 58 in the tag database 56 that may be deployed in the website of a domain owner server 24. In cases where there are no modified tag data structures 58 in the tag database 56, the tag deployment operation 140 may be configured not to occur and instead simply send a notification to the domain owner server 24 that requested the tag deployment that there are no tags available for deployment at that time.

Figure 5C:
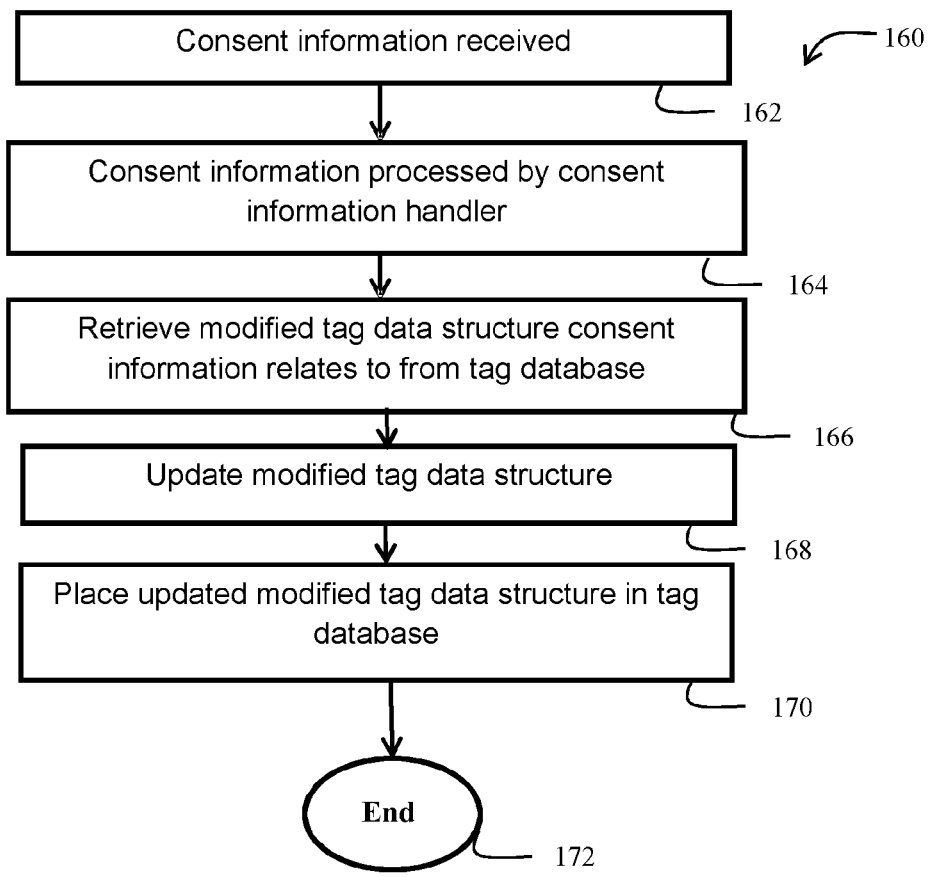
FIG. 5C is a flow diagram showing a method of operation of the system of FIG. 2 relating to the receipt of tag consent information from a domain owner server or website user.

Turning now to FIG. 5C, there is shown a consent information processing operation 160 of the consent management platform tool 50. Specifically, FIG. 5C shows the consent information processing operation 160 relating to the receipt of consent information for the use of specific tags from a user of a website 26. The method of operation 160 begins when the consent management platform tool 50 receives, at Step 162, consent information relating to one or more modified tag data structures 158 in the tag database 56. The consent information is received by the consent information handler 66. Once the consent information is received, the consent information processing operation 160 continues by the consent information handler 66 processing, at Step 164, the received consent information. This processing may comprise determining whether the provided consent information supplied contains sufficient information to enable modified tag data structures 58 in the tag database 56 to be updated. This information may include information relating to identification of the user accessing a website 26 upon which tags are to be deployed, the website to which the consent relates and indications of whether consent is provided or denied. In embodiments described above, where a single modified tag data structure 58 may comprise a plurality of purposes for which consent is to be provided, the supplied consent information may also include an indication of which purpose consent is being provided for. The processing may additionally comprise verifying the veracity and integrity of the tag request to ensure that the request can be processed by the consent management platform tool 50.

Once the consent information has been processed, the consent information processing operation 160 continues by passing the consent information to the tag modification engine 68 and retrieving, at Step 166, the relevant modified tag data structure 58 from the tag database 56. This may be achieved by comparing the parameters provided in the consent information supplied to the parameters of the modified tag data structures 58 in the tag database 56. The modified tag data structure 58 which has matching parameters is then retrieved. It is to be appreciated that whilst the consent information processing operation 160 describes the modification of a single modified tag database structure, the supplied consent information may relate to the provision of consent information for multiple modified tag data structures 58. In these situations, each of the relevant modified tag data structures 58 may be retrieved in series or in parallel.

Once the relevant modified tag data structure has been retrieved, the consent information processing operation 160 proceeds by updating, at Step 168, the retrieved structure with the received consent information. The updating is performed by the tag modification engine 68 appropriately appending the consent parameters 100 of the modified tag data structure with the consent information. Once the modified tag data structures 58 have been updated, they are written back, at Step 170, into the tag database 56 by the tag modification engine 68 for future retrieval and/or deployment onto a website. Following this step, the method of operation 160 proceeds to end at Step 172.

In some embodiments of this invention, when a modified tag data structure 58 has been updated, the tag modification engine 68 is also configured to send a notification that a modified tag data structure 58 has been updated to the tag selection processor 64. This additional step occurs after Step 170 and prior to Step 172 of the consent information processing operation 160. This notification indicates to the tag selection processor 64 that additional tags may be deployable in the website of the domain server owner 24, or that tags that have been deployed should no longer be deployed. This is described in further detail below with reference to FIG. 9.

Figure 6:
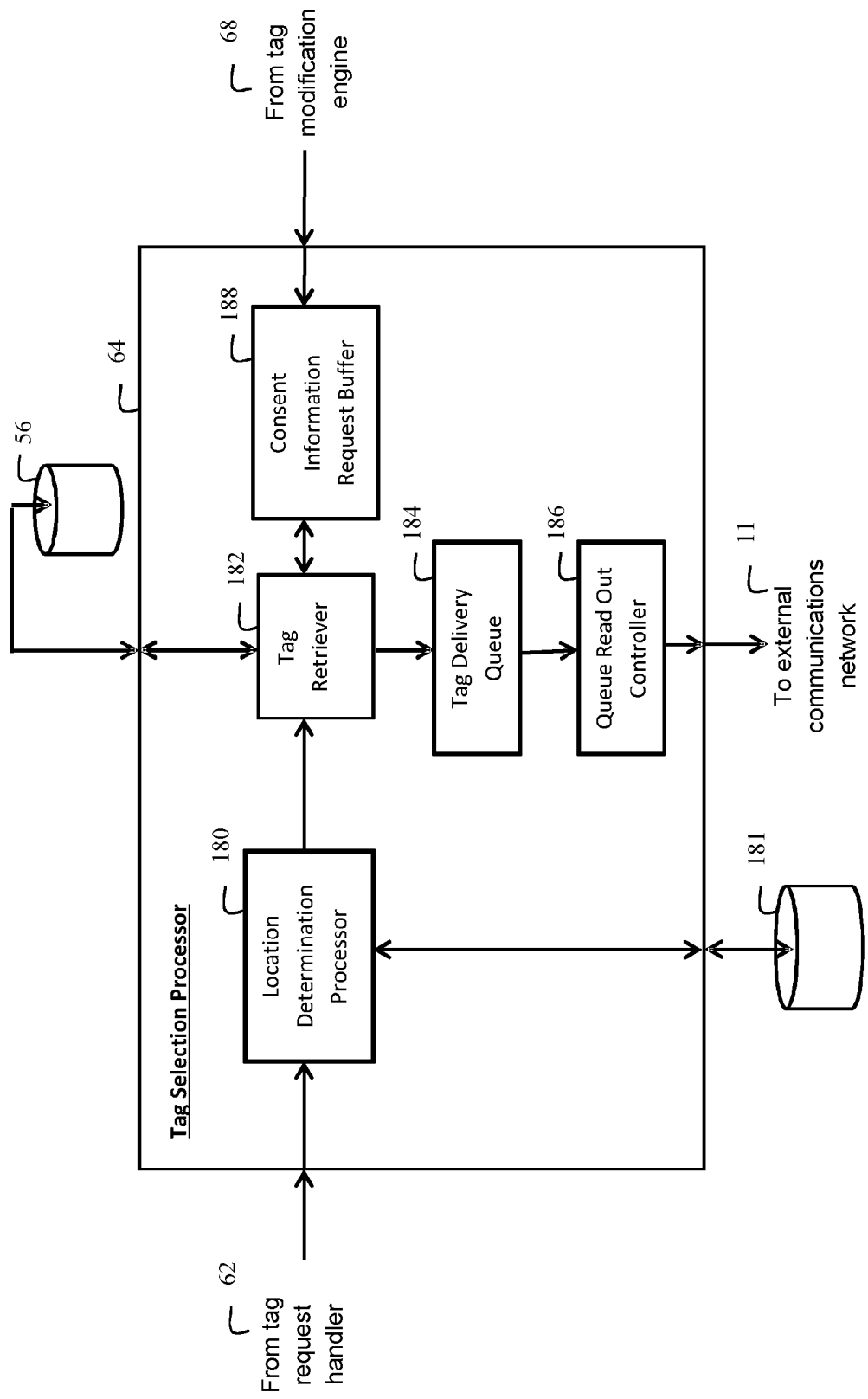
FIG. 6 is a schematic block diagram showing a tag selection processor of the consent management platform tool of FIG. 3.

Referring now to FIG. 6, there is shown in greater detail an embodiment of the tag selection processor 64 of consent management platform tool 50 of FIG. 2. The tag selection processor 64 is responsible for identifying the website upon which the tags are to be deployed, the user computer/device 52 which accessed the website, and subsequently determine which of the tags in the tag database 56 (which is coupled to the tag selection processor 64) should be deployed on the website. The tag selection processor 64 firstly comprises a location determination processor 180. The location determination processor 180 is configured to receive tag request information that has been previously processed from the tag request handler 62. The location determination processor 180 is additionally configured to determine from the provided information an identification of the user that has accessed the website 26 upon which the tags are to be deployed and use this information to determine the pseudonymous user ID parameter 104 of the user. This pseudonymous user ID parameter 104 is then appended to the tag request. In some embodiments, the information provided in the tag request includes the provision of a unique identifier, such as a static IP address minus the last octet, by the supplier of the consent information (typically the user computer/device 52). In some embodiments, the identification information may be provided via the use of information stored in a cookie on the user computer/device 52 through methods known in the prior art. In the above embodiments, the tag request handler 62 simply uses the provided information in order to identify the user accessing the website. In further embodiments, the user identification information is not directly provided. Instead, the information provided includes several non-identifying triangulation data points and the identification of the user is determined by the use of a suitable triangulation technique. These triangulation data points may include two or more of the following: the web browser type being used to access the website, the web browser version, the device type being used to access the website, an incomplete portion of the IP address used to access the website, local storage ID (identity), an entity tag, the presence of a first or third party cookie (although not the information contained within the cookie) and an advertiser ID (identity). The triangulation technique involves utilising a combination of two or more of the non-identifying triangulation points to uniquely identify the user. Whilst it is conceivable that two or more users may have the same value for some of the triangulation points, it is unlikely that these users will have identical values for each of the triangulation data points in combination. As such, each user may be uniquely identified by the combination of each of these triangulation data points. The use of such a technique enables the user to be identified even in the event that cookies stored on the user computer/device containing identification information are deleted or the browser prevents/blocks their use. Additionally, such a triangulation technique may enable the unique identification of the user to which the consent relates without requiring that personal information regarding the user (such as a full IP address) be supplied. This helps to maintain the anonymity of the user and minimises the need for the dissemination of their personal details.

In some embodiments of the present invention, the tag selection processor 64 may be additionally configured to determine what consent information is required in order for tags to be deployed. Different jurisdictions may have different governance requiring which consents are required by law in order for a tag to be deployed. In these embodiments, the location determination processor 180 may be appropriately configured to identify the jurisdiction that the user accessing the website 26 resides in and subsequently determine which consent information (if any) is required. This may be achieved, for example, by the location determination processor 180 receiving the IP address of the user, minus the last octet. This is typically sufficient to enable the country or region of the user to be determined (whilst still also allowing anonymity of the user). Where consent is required in this jurisdiction, the tag selection processor 64 may proceed to determine and request consents in accordance with embodiments herein. Where such consent is not required, the available tags may simply be retrieved and delivered to the website 26 without further consent verification being needed.

The location determination processor 180 is further configured to use the identification information determined in accordance with above embodiments to retrieve a pseudonymous user id parameter 104 corresponding to the identified user. Pseudonymous user IDs may be retrieved from a pseudonymous user ID database 181 to which the location determination processor 180 is coupled. The pseudonymous user ID database 181 is configured to store the pseudonymous user identification information with a corresponding pseudonymous user ID. The location determination processor 180 sends a request with the pseudonymous user identification information and retrieves the pseudonymous user ID from the pseudonymous user ID database 181. If such a pseudonymous user ID does not exist, the location determination processor 180 may be configured to create a new user pseudonymous ID parameter 104 which corresponds to this user and store the pseudonymous user ID 104 with the user identification information in the pseudonymous user ID database 181. Typically if this is required, it means that there are no tags with consent information stored in the tag database 56 (since that user is unknown to the consent management platform tool 50. In some embodiments where the pseudonymous user ID parameter 104 comprises user identification information such as the static IP address, cookie information or triangulation data points, this retrieval is not performed and the identification information is simply appended to the tag request.

The tag selection processor 64 additionally comprises a tag retriever 182 which is coupled to the location determination processor 180. The tag retriever 182 is configured to receive the tag request from the location determination processor 180 (including the pseudonymous user ID parameter 104 of the user accessing the website determined by the location determination processor 180), and subsequently use the provided information to retrieve tags that are to be deployed in the website 26. The tag retriever 182 is coupled to the tag database 56 which contains the stored modified tag data structures 58. The tag retriever 182 compares the information in the tag request provided from the location determination processor 180 to the information parameters in the modified tag data structures 58 in the tag database 56 and retrieves those tags that are to be deployed in the website 26 in accordance with the request. This comparison comprises retrieving modified tag data structures 58 for which the identified user has given consent to use. The pseudonymous user ID parameter 104 (or equivalently the pseudonymous user identification information) appended to the tag request is compared to the pseudonymous user ID consent parameter 104 in the modified tag data structures 58 stored in the tag database 56. The tag retriever 182 then retrieves the modified tag data structures 58 which the identified user has consented to use of.

The tag selection processor 64 additionally comprises a tag delivery queue 184 which is coupled to the tag retriever 182. The modified tag data structure or structures 58 retrieved by the tag retriever 182 are passed to the tag delivery queue 184 to be delivered to the website of the domain owner server 24. The tag selection processor 64 additionally comprises a tag queue read out controller 186 which enables the tags to be delivered to the website of the domain owner server 24 via the external communications network 11. In some embodiments of the present invention, as soon as a tag is placed in the tag delivery queue 184, it is passed to the tag queue read out controller 186 for delivery. In other embodiments of the present invention, the tags are only delivered once all tags marked for delivery are present in the tag delivery queue 184.

The tag selection processor 64 additionally comprises a consent information request buffer 188 which is coupled to the tag retriever 182. In addition to retrieving tags that are to be delivered to the website of the domain owner server 24, the tag retriever 182 is configured to retrieve tag data structures 58 for which no consent information is available for the identified user. Information relating to these retrieved tag data structures 58 is then passed to the consent information request buffer 188. The information is held in the queue 188 until consent information is made available for the relevant tags. The queue 188 is also configured to send a request for the consent information for these tag data structures 58 to the website of the domain owner server 24 via the external communications network 11. This may be achieved by sending a consent prompt tag 110 to the website of the domain owner server 24 in accordance with embodiments described above. In these embodiments, when the tag retriever 182 determines that there exists an available tag with no consent information for the identified user, the tag retriever may be configured to retrieve a consent prompt tag 110 which is stored in the tag database 56, where the consent prompt tag 110 is in accordance with embodiments described above. The tag retriever 182 is configured to populate the instructions with information regarding the one or more tags for which consent information is required. This tag is then passed to the tag delivery queue 184 and subsequently to the website of the domain owner server 24 in accordance with the above embodiments. In embodiments where all tags to be delivered are held in the tag delivery queue 184 until all tags to be delivered have been retrieved, the consent prompt tag 110 is still delivered immediately once it has been delivered to the tag delivery queue 184, namely the consent prompt tag 110 is not queued but rather output immediately regardless of the length of the queue. Alternatively, the request for consent information may be achieved by any other suitable method which enables the consent information for tags to be received.

Once the consent information is received, a notification may be received by the consent information request buffer 188 from the tag modification engine 68 indicating that the consent information has been received. The consent information request buffer 188 is coupled to the tag retriever 182 and upon receipt of the notification, notifies the tag retriever 182 that the consent information of one or more tags has been updated. The tag retriever 182 then determines whether the updated modified tag data structures 58 have sufficient consent to be deployed. Where it does, the corresponding modified tag data structure or structures 58 are retrieved by the tag retriever 182 and delivered to the website 26 of the domain owner server in accordance with embodiments described above. The corresponding information is additionally removed from the consent information request buffer 188. Where such consent is not provided, the modified tag data structure is not removed, but the information is still removed from the consent information request buffer 188.

In some embodiments, the tags to be delivered are held in the tag delivery queue 184 until consent information is provided for all available tags in the tag database 56. In other embodiments, the modified tag data structures 58 which are initially determined to have required consent are delivered to the website of the domain owner server 24 first. Any further modified tag data structures 58 which are then subsequently provided with consent are delivered at a later point (once the consent has been given).

In some embodiments, a user may provide consent information without receiving a request for such consent information. In these embodiments, the consent information request buffer 188 may still be configured to receive notification that consent information has been provided, even though no entry is present in the queue 188. This may be achieved by creating a notional entry in the queue 188 upon receipt of the notification indicating the relevant tags to which the notification relates. The queue 188 then notifies the tag retriever 182 of this update in consent information in accordance with embodiments described above.

In embodiments of the present invention in which tag requests are provided to the consent management platform tool 50 via the use of a consenTag stored on the domain owner server 24 (not shown in the accompanying figures), the consenTag may be configured to receive and process any requests for additional consent information. This may be achieved by appropriately configuring instructions of the consenTag to display a pop up on the website of the domain owner server 24 upon receipt of a request for consent information. The pop up may be configured to request that a user provide the consents that are determined to be required by the tag selection processor 64. In such embodiments, it may not be necessary for the tag selection processor 64 to provide a consent prompt tag 110 with configured instructions, and may simply require that information relating to the required consents is provided. The configured consenTag may then, in accordance with its instructions, utilise this information to generate the pop up (or alternative method of obtaining the consents). Upon receipt of the newly provided consents, the instructions of the consenTag may be configured to provide the updated consents to the consent management platform tool 50, in accordance with embodiments described below with reference to FIG. 8.

Figure 7A:
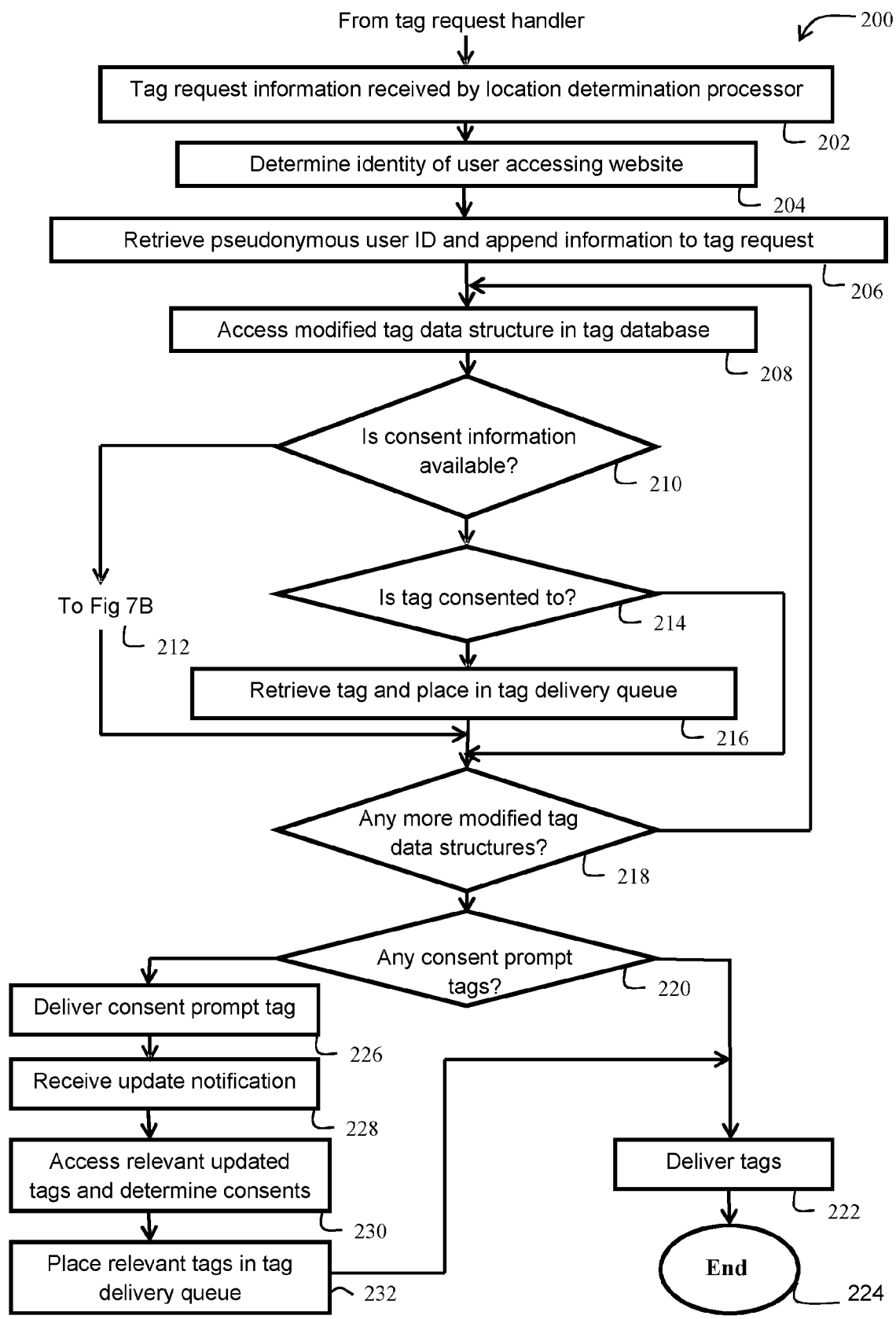
FIG. 7A is a flow diagram showing a method of operation of the tag selection processor of FIG. 6 to deploy consented tags on a website.

Referring now to FIG. 7A, there is shown a method of operation 200 of the tag selection processor 64 of FIG. 6 in accordance with an embodiment of the present invention. In particular, the method 200 shows the procedure followed in order to retrieve tags to be deployed in the website of a domain owner server 24. The method 200 begins by receiving, at Step 202, tag request information from the tag request handler 62. The tag request information is received by the location determination processor 180. Once the information is received, the method 200 continues by determining, at Step 204, the identity of the user who has accessed the website 26 which is requesting tags be deployed. This determination may be achieved in accordance with embodiments described above (i.e. through use of a unique identification included in the tag request, or through a triangulation method). Once the identity of the user has been determined, the method continues by retrieving, at Step 206, the pseudonymous user ID of the identified user from the pseudonymous user ID database 181 and this is appended to the information included in the tag request. In some embodiments described above, the pseudonymous user ID parameter 104 comprises pseudonymous user identification information such as the static IP address, cookie information or triangulation data points, this retrieval is not performed and the identification information is simply appended to the tag request. In other embodiments, upon attempting the retrieval of a pseudonymous user ID, it may be determined that no such ID exists for that user. In this case, the location determination processor 180 may be configured to create a new pseudonymous user ID (not shown) and place this in the pseudonymous user ID database 181 in conjunction with the user identification information. This newly created pseudonymous user ID is then appended to the tag request information in accordance with embodiments above.

Following the retrieval and appending of pseudonymous user ID information to the tag request, the information is passed to the tag retriever 182 and the method 200 proceeds to access, at Step 208, a first modified tag data structure 58 in the tag database 56. This first modified tag data structure 58 may comprise any tag data structure 58 in the tag database 56 which has not yet been accessed as part of the current tag request. In some embodiments, the modified tag data structure 58 in the tag database 56 may be restricted to use on certain websites only. In these embodiments, the modified tag data structures 58 which may be accessed may be restricted to those that are available for the website that the tag request relates to. This may be determined by information provided in the tag request being compared to the website ID parameters 92A, 92B, 92C of the modified tag data structures 58.

Once the first modified tag data structure 58 is accessed, the method 200 then proceeds to determine, at Step 210 whether there is consent information available for the user in the accessed modified tag data structure 58. In some embodiments, there will only be one consent to be determined in the modified tag data structure 58 (such as where consent is provided unilaterally for a particular data collector 36, 38 or where the tag is only to be used for one purpose). In other embodiments, a single modified tag data structure 58 may have a plurality of consents to be determined. In these embodiments, the determination at Step 210 comprises determine whether consent information is present for each of the plurality of available consents.

If it is determined that the consent information is not available for either one or a plurality of the consents in the modified tag data structure 58, the method 200 proceeds by generating, at Step 212 and/or updating a consent prompt tag 110. This process is described further in FIG. 7B. If instead it is determined that the required consent information is available, the method proceeds to determine, at Step 214, whether the modified tag data structure 58 may be delivered in accordance with the consent information relating to the user. If it is determined that the tag may be used and deployed, the method 200 proceeds by retrieving, at Step 216, the related tag from the tag database 56 and placing it in the tag delivery queue 184. In embodiments where a single modified tag data structure 58 may have several consents included within it (i.e. for a plurality of purposes), the tag may be retrieved only for the aspects of the modified tag data structure 58 that have consent to be deployed.

Once the tag has been placed in the tag delivery queue 184, the method 200 proceeds by determining, at Step 218, whether there are any further modified tag data structures 58 in the tag database 56 that have not yet been accessed in respect of the current tag request. Returning briefly to Step 214, if it is determined that the use of a tag has actively been denied, the method 200 also proceeds directly to Step 218 missing out Step 216. Returning to Step 218, if it is determined that there are further modified tag data structures 58 in the tag database 56 that have not yet been accessed in respect of the current tag request, the method 200 returns to Step 208 and the next modified tag data structure 58 is accessed. If instead it is determined that there are no further modified tag data structures 58 to be accessed, the method proceeds to determine, at Step 220, whether there is a consent prompt tag 110 present in the tag delivery queue 184. If it is determined that there are no consent prompt tags 110, the method proceeds to deliver, at Step 222, the tags in the tag delivery queue 184 to the domain owner server 24 via the tag queue read out controller 186 and the external communications network 11 in accordance with above embodiments. The method 200 then proceeds to finish at Step 224.

Returning to Step 220, if it is determined that a consent prompt tag 110 is present in the tag delivery queue 184, the method proceeds to deliver, at Step 226, the consent prompt tag 110 to the domain owner server 24 via the tag queue read out controller 186 and the external communications network 11 in accordance with above embodiments. The method 200 then proceeds to wait until an update notification is received, at Step 228, indicating that updated consent information relating to the consent prompt tag 110 has been received by the consent information request buffer 188. The consent information request buffer 188 will have been populated with information regarding tags for which consent information is required in accordance with the method of FIG. 7B described below. Following receipt of this notification, the method 200 continues by accessing and determining, at Step 230, the consents of the relevant updated tags from the tag database 56. This access and determination is achieved in an analogous method to that described in Steps 208 and 214 above. It is to be appreciated that Step 210 is not required, since the updated tags have consent by design. The method 200 then proceeds to place, in Step 232, any tags that have been determined to have consent in the tag delivery queue 184 in a step analogous to Step 216 described above. The method 200 then proceeds to Step 222. Further information regarding how updated consent information is received is described in further detail below with reference to FIG. 9.

It is to be appreciated that the checking of the veracity of a data message as has been described in the above embodiments is not described in further detail herein as it will be apparent to the skilled addressee how to undertake this task. For example basic error checking of data can be carried out using cyclic redundancy checks or comparing formats of received and expected message structures.

Figure 7B:
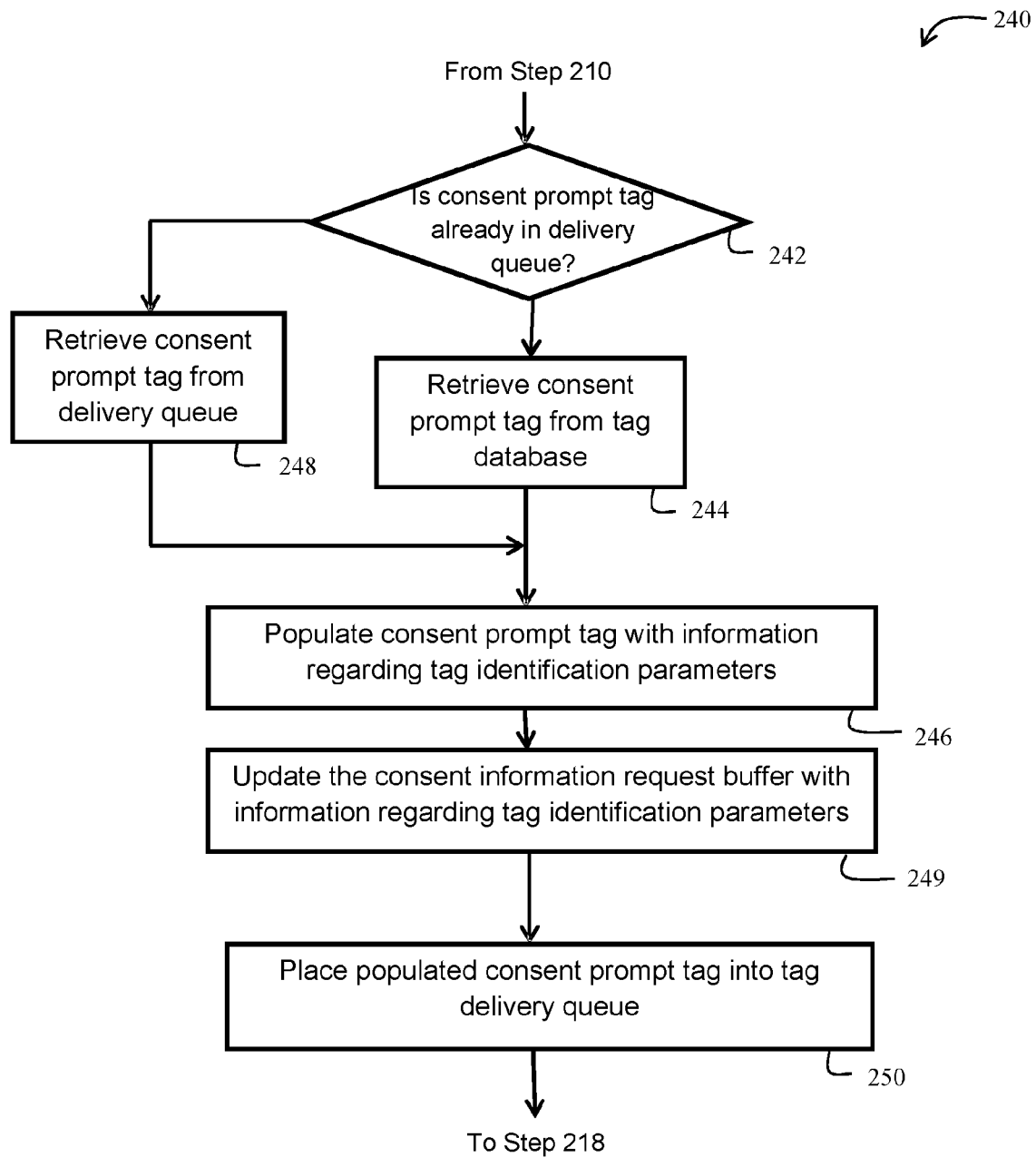
FIG. 7B is a flow diagram showing a method of operation of the tag selection processor of FIG. 6 to prepare a consent prompt tag for deployment when consent information for a tag is not available.

Referring now to FIG. 7B, there is shown a consent obtaining operation 240 of the tag selection processor 64 of FIG. 6 in accordance with an embodiment of the present invention. In particular, the consent obtaining operation 240 illustrates the procedure to be followed if it is determined that a tag in the tag database 56 does not contain consent information for a user accessing a website. The consent obtaining operation 240 begins when it is determined at Step 210 of FIG. 7A that there is no consent information available for a modified tag data structure 58 in the tag database 56. Upon such a determination, the consent obtaining operation 240 proceeds by determining, at Step 242, whether there is a consent prompt tag 110 in the tag delivery queue 184. The consent prompt tag 110 may be in accordance with embodiments described above. In embodiments of the present invention, a consent prompt tag 110 is available in the tag database 56 and is configured to be retrieved as and when it is determined that a tag to be deployed on the website 26 has undefined consent information for a particular user. A consent prompt tag 110 may already be available in the tag delivery queue 184 if a previous analysis of the modified tag data structures 58 in the tag database 56 identifies a different tag is missing consent information.

If it is determined that there is no consent prompt tag 110 already present in the tag delivery queue 184, then the consent obtaining operation 240 proceeds by the tag retriever 182 retrieving, at Step 244, a consent prompt tag 110 from the tag database 56. The consent obtaining operation 240 then continues by populating, at Step 246, the retrieved consent prompt tag with information regarding the modified tag data structure 58 which is missing consent information. This information may comprise any information parameters which are required to enable the relevant tag which requires consent to be identified by the user. This can include the collector ID 86, the purpose that the tag is being used for and any additional information regarding the ID of the website. The information being populated may be included within the instructions 88 of the consent prompt tag 110 in such a way that when the tag is fired on the website to which it is later delivered, the tag notifies the user of the website that the relevant consents are required and collects the subsequently provided information for transmission back to the consent management platform tool 50. Returning to Step 242, if it determined that there is already a consent prompt tag 110 present in the tag delivery queue 184, then the consent obtaining operation 240 proceeds instead to retrieve, at Step 248, the consent prompt tag from the tag delivery queue 184. This retrieval occurs analogously to the retrieval of the consent prompt tag 110 from the tag database 56. The consent obtaining operation 240 then proceeds again to Step 246 where the consent prompt tag is populated with any information parameters which are required to enable the relevant tag which requires consent to be identified by the user in accordance with embodiments described above. As part of the population process in this scenario, the tag retriever 182 ensures that the population process enables the tag to retrieve consents for all tags for which consent is required. This means that existing information included in the consent prompt tag 110 is not overwritten. In some embodiments, rather than generating a single consent prompt tag 110 the tag retriever 182 retrieves and populates a separate consent prompt tag 110 for each of the tags for which consent information is required.

Once the consent prompt tag 110 has been populated, the consent obtaining operation 240 proceeds by updating, at Step 249, the consent information request buffer 188 with information regarding the tags for which consent information is required. The information in the consent information request buffer 188 is typically similar to that which is included in the consent prompt tag 110 and usually contains information relating to the same tags. The purpose of the consent information request buffer 188 is to maintain a record of those tags for which consent information has been requested but not yet received. The consent information request buffer 188 is updated at Step 228 of FIG. 7A when a consent update is received and subsequently delivers a notification to the tag retriever 182 to indicate that a tag which previously lacked consent information has now been provided with such information.

Once the consent information request buffer 188 has been populated with information in accordance with embodiments described above, the consent obtaining operation 240 continues to place, at Step 250, the populated consent prompt tag 110 into the tag delivery queue 184 ready for subsequent delivery. Once the consent prompt tag 110 is placed in the tag delivery queue 184, the consent obtaining operation continues by proceeding to Step 218 of FIG. 7A, where it is determined whether any further modified tag data structures 58 are to be analysed to determine whether they can be deployed.

In some embodiments (not shown in the accompanying figures), the populated consent prompt tag 110 may be placed into an alternate queue than the tag delivery queue 184. In such embodiments, the consent prompt tag 110 is kept separate from the modified tag data structures 58 that have been identified for delivery. In these embodiments, the consent obtaining operation 240 is configured to instead determine whether a consent prompt tag 110 is present in this separate queue, and to place a populated consent prompt tag 110 into the separate queue. For these embodiments. Similarly, in Step 220 of FIG. 7A, the determination of whether any consent prompt tags 110 are present is made with reference to this separate queue.

Figure 8:
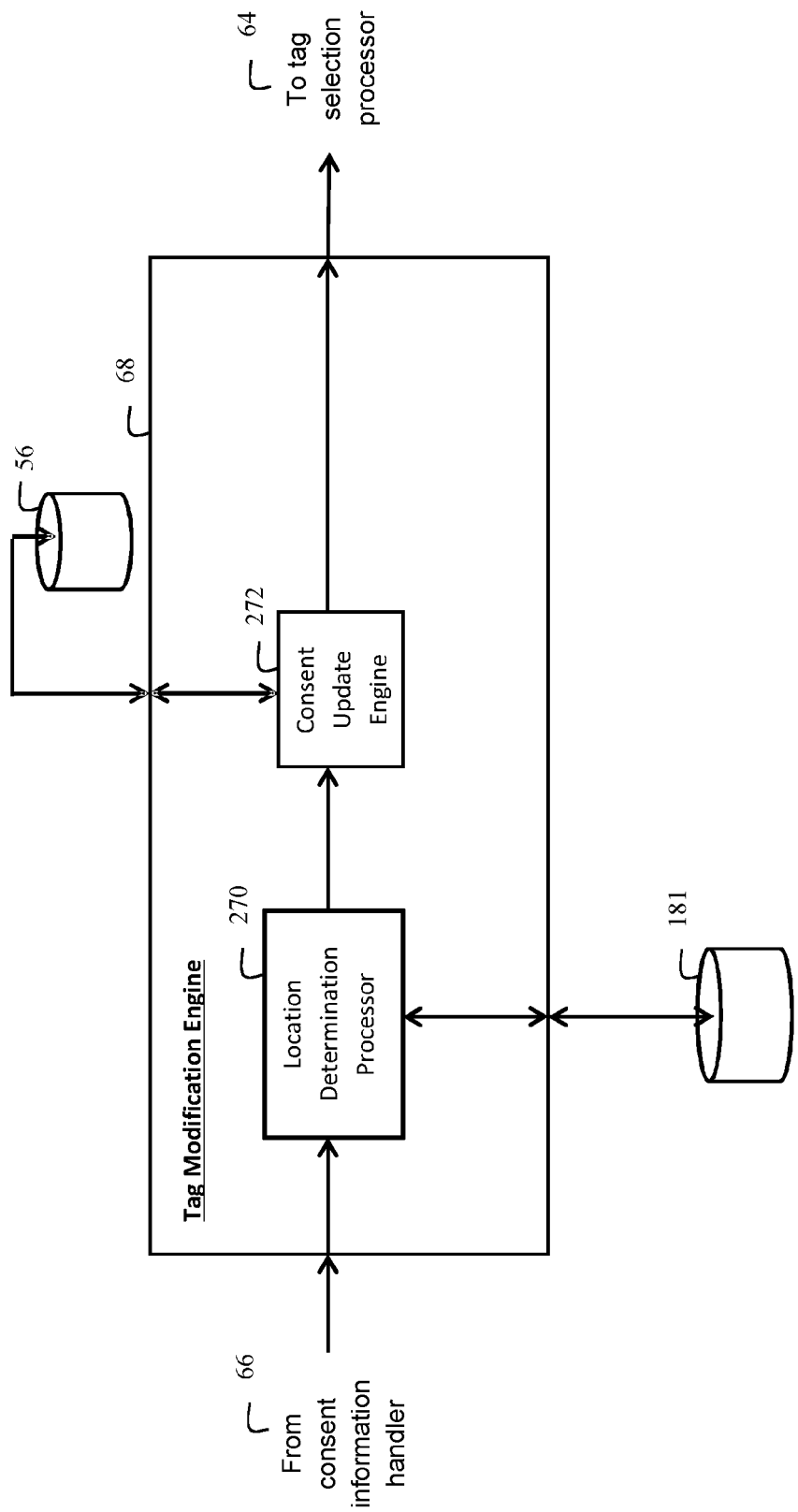
FIG. 8 is a schematic block diagram showing a tag modification module of the consent management platform tool of FIG. 3.

Referring now to FIG. 8, there is shown in greater detail an embodiment of the tag modification engine 68 of consent management platform tool 50 of FIG. 2. The tag modification engine 68 is configured to receive information relating to updating the consent information of a modified tag data structure 58 and to update the corresponding modified tag data structure 68 accordingly.

The tag modification engine 68 comprises a location determination processor 270. This is configured to receive information relating to an update to consent information from the consent information handler 66 in accordance with embodiments described above. The location determination processor 270 is additionally configured to determine the identification of the user to which the consent update information relates. This pseudonymous user identification is performed analogously to the location determination processor 180 of the tag selection processor 64 described above with reference to FIG. 6, except the pseudonymous user identification information is provided from a consent information update, rather than from a request of tag deployment. To that end the location determination processor 270 is also coupled to the pseudonymous user ID database 181. For the purposes of brevity, the functionality of the location determination processor 270 will not be described again at this time.

The tag modification engine 68 additionally comprises a consent update engine 272 which is coupled to the location determination processor 270. The consent update engine 272 receives consent update information from the location determination processor 270 indicating the identification of the user to which the consent update information relates, the specific tag for which the update is to be provided, as well as the update information itself. The consent update engine 272 is additionally coupled to the tag database 56. The consent update engine uses the received information to retrieve the relevant modified tag data structure 58 from the tag database 56, update the relevant consent parameters of the tag to be updated in accordance with the provided consent information and then place the updated modified tag data structure 58 back into the tag database 56. The way this is achieved is described below with reference to FIG. 9. In addition, once the updated modified tag data structure 58 is returned, the consent update engine 272 is also configured to send a notification of the update to the tag selection processor 64 so that it can determine whether the update should affect the delivery of tags to a website on a domain owner server 24. This is performed in accordance with embodiments described above.

The tag modification engine 68 may receive information relating to the update of consent to a single tag or to the consent of a plurality of tags simultaneously. In the case where consent is provided for a plurality of tags, the tag modification engine 68 may be configured to either process each of these in series or in parallel.

Figure 9:
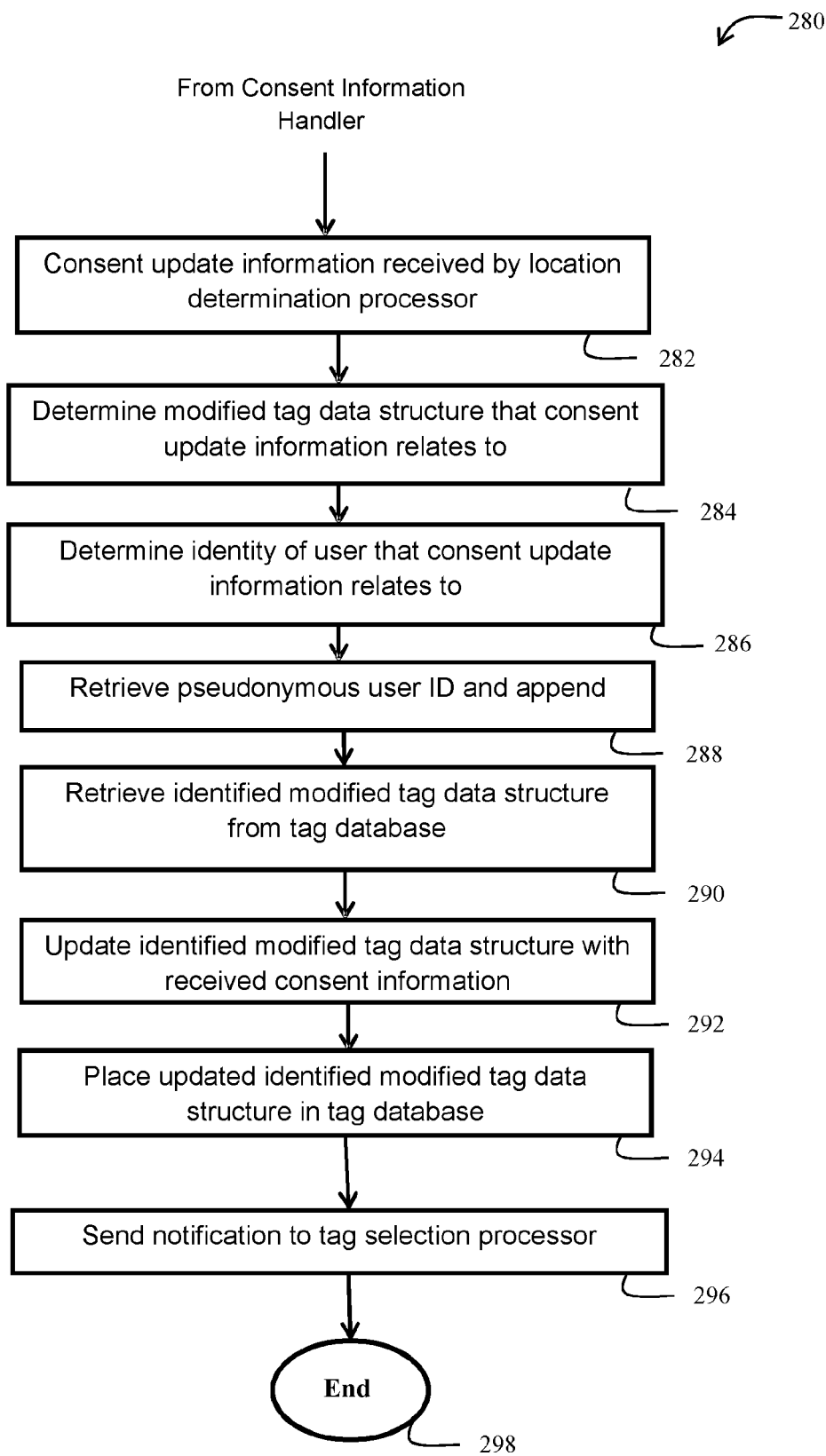
FIG. 9 is a flow diagram showing a method of operation of the tag modification module of FIG. 8 to update consent information of a tag.

Turning now to FIG. 9, there is shown a consent updating operation 280 of the tag modification engine 68 of FIG. 8. Specifically, the consent updating operation 280 shows how the tag modification engine 68 may be used to update the consent information of one or more modified tag data structures 58 and to notify the tag selection processor 64 that an update has been provided. The consent updating operation 280 begins when consent information is received, at Step 282 from the consent information handler 66 by the location determination processor 270 of the tag modification engine 68. Once the information is received, the consent updating operation 280 continues by determining, at Step 284, the modified tag data structure 58 that the received consent information relates to. This information is typically present in the consent information that has been provided and the determination of whether such information exists may be included as part of the processing performed by the consent information handler 66 as discussed in Step 164 of FIG. 5C. The information provided may, for example, comprise the provision of the tag ID 84 that identifies the modified tag data structure 58.

Once the tag that the consent information relates to is identified, the consent updating operation 280 proceeds by determining, at Step 286, the identity of the user who has accessed the website 26 which is requesting tags be deployed. This determination may be achieved in accordance with embodiments described above (i.e. through use of a unique identification included in the tag request, or through a triangulation method). Once the identity of the user has been determined, the consent updating operation continues by retrieving, at Step 288, the pseudonymous user ID of the identified user from the pseudonymous user ID database 181 and this is appended to the information included in the consent information. In some embodiments described above, the pseudonymous user ID parameter 104 comprises pseudonymous user identification information such as the static IP address, cookie information or triangulation data points, this retrieval is not performed (as it is not required) and the identification information is simply appended to the consent information. In other embodiments, upon attempting the retrieval of a pseudonymous user ID, it may be determined that no such ID exists for that user. In this case, unlike in the case of the tag selection processor 64, the consent update is configured to fail. This is because the purpose of the tag modification engine 68 is to update user consent in a pre-existing tag, and this pre-existing tag must have an associated user. If such a failure occurs, the domain owner server 24 may be notified of this failure.

The identification of the user may not always be necessary. This is true in the case where modified tag data structures 58 are created for an individual user rather than a plurality of users. In this case, it is sufficient only to identify the tag in question. In scenarios where a single modified tag data structure 58 may contain consent information for a plurality of users, it is also necessary to identify the user in order to identify which consent parameters need to be updated.

Following the appending of the pseudonymous user identification information, the consent updating operation 280 continues by retrieving, at Step 290, the relevant modified tag data structure 58 from the tag database 56. This may be achieved by utilising the tag identification information determined in Step 284 (such as the tag ID 84) and retrieving the modified tag data structure 58 that has matching tag identification information. Once the modified tag data structure 58 has been retrieved, the consent updating operation 280 continues by updating, at Step 292, the identified modified tag data structure 58 with the received consent information. This may comprise populating the relevant binary consent parameters 106A, 106B with the consent information in cases where the parameters are currently undefined. In some embodiments, updates to existing binary consent parameters 106A, 106B may be provided. In these cases, the updating step may comprise overwriting the existing binary consent parameters 106A, 106B with the new consent information. In embodiments where the modified tag data structure 58 comprises information relating to multiple user consents, the updating step may additionally comprise identifying which user's binary consent parameters 106A, 106B are to be updated, where such identification is enabled by utilising the previously determined pseudonymous user identification information.

Once the binary consent parameters 106A, 106B have been updated, the consent updating operation 280 proceeds by placing, at Step 294, the updated modified tag data structure 58 into the tag database 56 ready for subsequent retrieval. The consent updating operation 280 of this embodiment then proceeds to send, at Step 296, a notification that the modified tag data structure 58 has been updated with new consent information to the tag selection processor 64. This notification may identify the tag that has been updated in addition to the user that the updated consent relates to where appropriate. Following this step, the consent updating operation 280 ends 298. In some embodiments, no notification is sent and instead, the tag selection processor 64 persistently monitors the tag database 56 for any updates to the tags contained in the tag database 56.

In some embodiments, the tag modification engine 68 may receive information relating to the update of consent to a single tag or to the consent of a plurality of tags simultaneously (or receive information relating to updated consent for a plurality of users for a single tag). In these embodiments, the consent updating operation 280 may be configured to either process each of these in series or in parallel.

Figure 10:
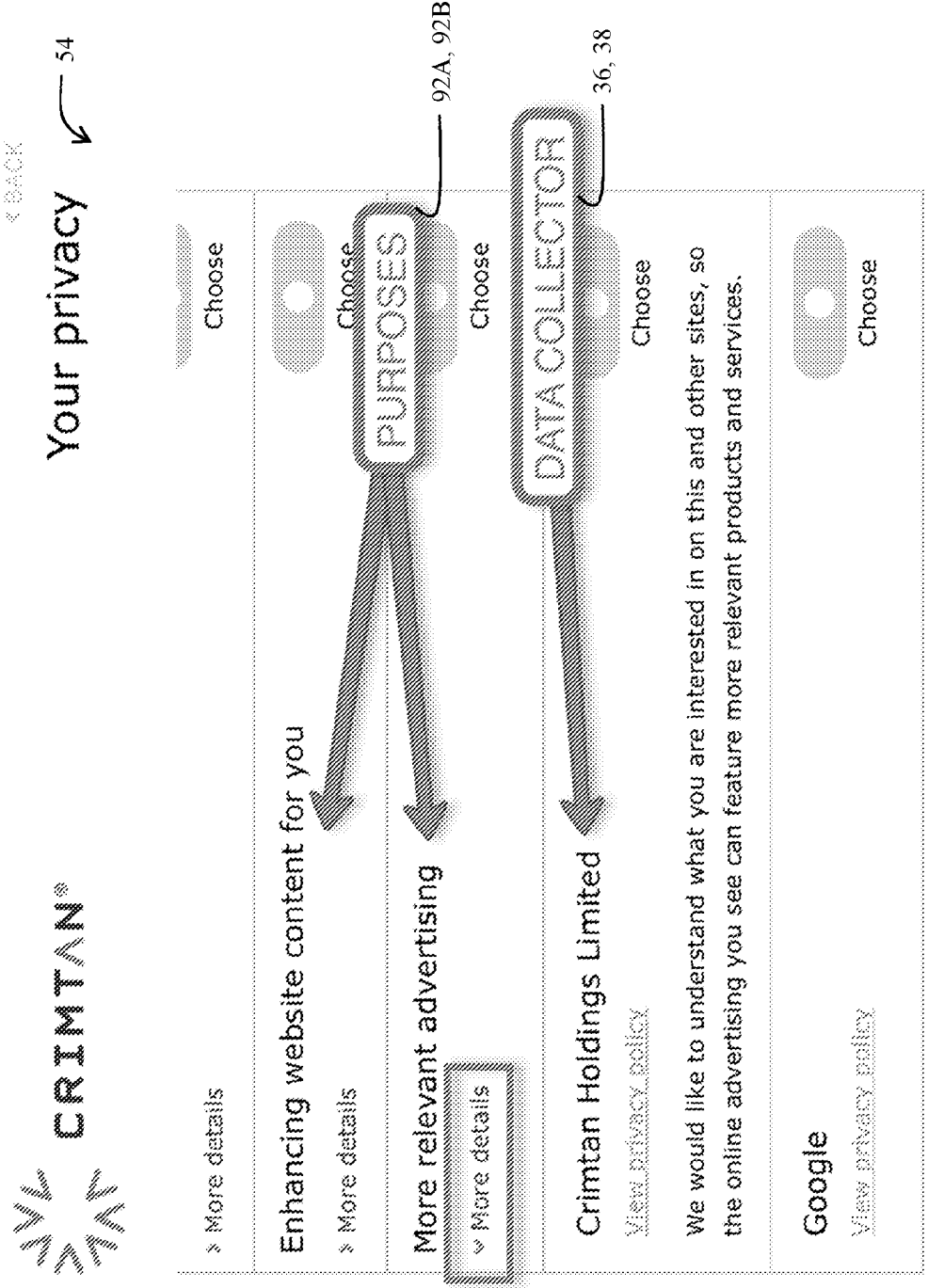
FIG. 10 is an example of a consent choice panel of FIG. 2, presented to a user to enable their consent information to be collected.

Turning to FIG. 10, there is shown an example embodiment of a consent choice panel 54 that may be presented to a user upon a consent prompt tag being placed upon a website and subsequently fired. The consent choice panel 54 may also be manually deployed by a user if they wish to update their existing consent choices at any point. This consent choice panel 54 provides the user with selectable options relating to whether they consent to the use of a tag for a specific purpose 92A, 92B and a specific data collector 36, 38. It is to be understood that this is simply an example of how a consent choice panel may be displayed to obtain the required consent information and that this may be modified in accordance with the preferences of a user of the system. In some embodiments, the consent choice panel 54 may be modified by altering the code provided in the instructions of the consent prompt tag 110. The difference between the consent choice panel 54 of the present embodiment and the consent choice logger 29 of the prior art is that the consent choice logger is simply a data structure that contains details of the user's consent that has previously been provided. It does not enable the user to actively monitor and manage their consents in real time as is the case for the consent choice panel 54.

In further embodiments of the present invention, the way in which consent information is stored is managed in a different way. In these embodiments, consent information is associated with a particular user as opposed to being stored in the modified tag data structure 58. In these embodiments, the modified tag data structure 58 may then not include consent parameters 100, and instead only include collector parameters 82 in accordance with the modified tag data structure 58 of FIG. 4B. The consent information is then stored in the pseudonymous user ID database 181. In these embodiments, each entry in the pseudonymous user ID database may include the pseudonymous user ID 104, corresponding user identification information that may be used to identify the user, and consent information indicating whether the corresponding user has consented to the use of a particular tag for a particular purpose.

Figure 11:
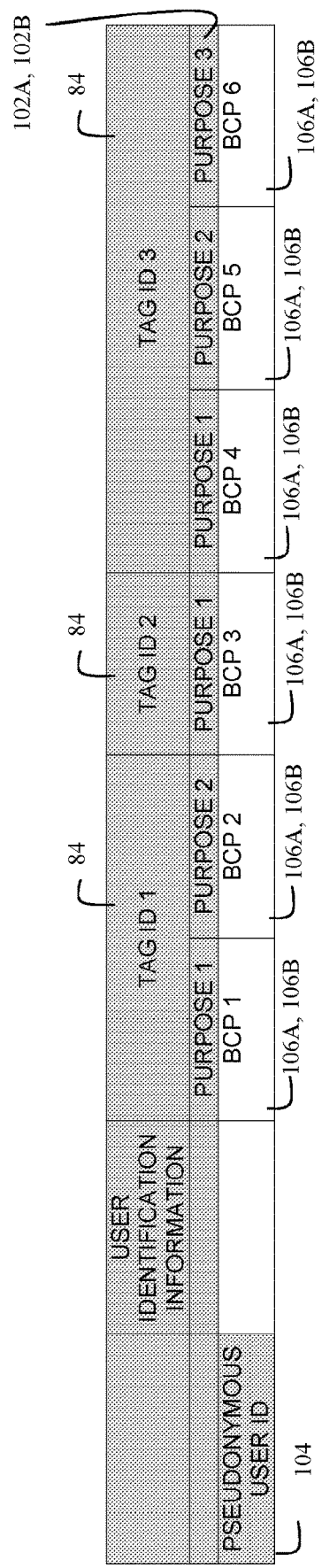
FIG. 11 is an example of a lookup reference table which may be used to determine user consents in an embodiment of the consent management platform tool of FIG. 3.

In some embodiments, the information stored in the pseudonymous user ID database 181 is stored in the form of a lookup table. Each row of the lookup table comprises information relating to a particular pseudonymous user ID 104. The columns of the lookup table may then firstly comprise the user identification information in accordance with embodiments described above in order to enable identification of the pseudonymous user ID 104. Further columns may then be populated with tag IDs 84 and purposes 102A, 102B. For each tag ID 84 and purpose, consent information will be stored indicating whether the pseudonymous user ID 104 has consented to the use of the tag for that purpose. This may be achieved via the use of binary consent parameters 106A, 106B. An example of a potential format of this table is shown in FIG. 11. In further examples (not shown in the accompanying figures), the columns may additionally specify separate domain user servers 24 and websites 26 hosted by these user domain servers 24. Each of these columns may then be subdivided to include each of the tags which may be available to these domain owner servers 24 and websites 26, with consent being provided for each tag and each purpose.

When determining whether a tag may be deployed on a website 26 upon request, the consent information for each purpose 102A, 102B is compared to corresponding use parameters for each tag included in the tag database 56. Where consent is given for a particular purpose/use, that tag may be retrieved and subsequently deployed in accordance with embodiments described herein.

In embodiments where consent information is stored with the pseudonymous user ID 104, some modifications to the systems and methods described herein are required. Referring firstly to FIGS. 6 and 7A, when the pseudonymous user ID 104 is retrieved from the pseudonymous user ID database 181 by the location determination processor 180, this will comprise retrieving the row entry of the identified pseudonymous user, with all of the columns indicating the available consent information. This is then passed to the tag retriever 182. At this point, at Step 208, the tag database 56 will be accessed and each tag present in the tag database 56 will in turn be compared to the information retrieved from the pseudonymous user ID database 181 using the tag ID parameters 84. The method then continues as described in FIG. 7A, with consent information determined with reference to the retrieved pseudonymous user ID information, rather than determined with reference to the modified tag data structure 58.

With reference now to FIGS. 8 and 9, some modifications are also required when updated consent information is provided. Analogously to above, when the pseudonymous user ID 104 is retrieved from the pseudonymous user ID database 181 by the location determination processor 270 (at Step 288), this will comprise retrieving the row entry of the identified pseudonymous user, with all of the columns indicating the available consent information. This is then passed to the consent update engine 182. The consent update engine is then configured to update the retrieved information with the new consent information. In cases where this comprises providing information regarding a tag that has previously not been consented to, this may mean appending one or more columns to the end of the retrieved table. The consent update engine 182 in this embodiment is then additionally coupled to the user ID database 181 and following the updating of information, the consent update engine 182 places the modified information back into the user ID database 181. It will then send a notification to the tag selection processor 64 indicating that consent information for a particular tag ID 84 has been updated. In these embodiments, it may not be necessary for the consent update engine 182 to retrieve any information from the tag database 56, since the tags themselves are not modified, only the consents associated with a user.

Furthermore, it will be understood that features, advantages and functionality of the different embodiments described herein may be combined where context allows.

Having described several exemplary embodiments of the present invention and the implementation of different functions of the device in detail, it is to be appreciated that the skilled addressee will readily be able to adapt the basic configuration of the system to carry out described functionality without requiring detailed explanation of how this would be achieved. Therefore, in the present specification several functions of the system have been described in different places without an explanation of the required detailed implementation as this not necessary given the abilities of the skilled addressee to code functionality into the system.

The invention claimed is:

1. A computer-implemented method of providing one or more selected tracking tags to a domain owner server for deployment on a website, the one or more tracking tags being selected from a set of available tracking tags, the method comprising:
   storing the set of available tracking tags, each available tracking tag including a purpose parameter describing a use to which data collected by the available tracking tag will be put;
   storing a plurality of user identifiers and a plurality of sets of tag-selection parameters, each user identifier identifying a website user and having an associated set of tag-selection parameters which identity a specific tracking tag and indicate whether a user consent has been obtained for a specific purpose of the specific tag;
   receiving, from the domain owner server, a request for deployment of one or more tracking tags on the website, the request including a received user identifier identifying a user accessing the website;
   for a user identifier corresponding to the received user identifier, comparing the tag-selection parameters for each specific tracking tag to the purpose parameter of each corresponding available tracking tag;
   selecting available tracking tags where the purpose parameter of the available tracking tag corresponds to a specific purpose which has an indication of user consent in the corresponding tag-selection parameters; and
   transmitting the selected available tracking tags to the domain owner server for deployment on the website.

2. The computer-implemented method of claim 1, wherein the step of storing the plurality of user identifiers comprises storing tag-selection parameters which indicate whether a user dissent has been determined for a specific purpose of the specific tag.

3. The computer-implemented method of claim 1, further comprising determining whether a user dissent or a user consent exists in the stored sets of tag-selection parameters.

4. The computer-implemented method of claim 3, wherein if it is determined that no user consent or dissent exists, the method further comprises obtaining the user consent or the user dissent from the user.

5. The computer-implemented method of claim 4, wherein the obtaining the user consent comprises:
   sending a message to the domain owner server requesting consent; and
   upon receipt of a response from the server indicating the user consent or the user dissent, using of the specific purpose of the specific tag to modify the associated set of tag-selection parameters which identify the specific tracking tag.

6. The computer-implemented method of claim 4, further comprising providing a consent prompt tag to gather information about the user consent or the user dissent from the user regarding one or more of the available tracking tags which has no user consent or user dissent for a particular purpose.

7. The computer-implemented method of claim 6, wherein the consent prompt tag is configured to generate a consent choice panel in a graphical user interface on the user's browser when deployed on the web site.

8. The computer-implemented method of claim 3, further comprising:
   determining that the received user identifier does not correspond to any of the stored user identifiers; and
   using the received user identifier to create a new stored user identifier and providing a corresponding associated set of tag-selection parameters which identify a specific tracking tag and indicate whether the user consent or the user dissent has been obtained for a specific purpose of the specific tag.

9. The computer-implemented method of claim 1, wherein the step of storing a plurality of sets of tag-selection parameters comprises storing plurality of sets of tag-selection parameters where each set of tag-selection parameters comprise:
   a tag identification parameter identifying a specific tracking tag in the set of available tracking tags;
   one or more purpose parameters indicating the purpose that data collected by the specific tracking tag will be used for; and
   one or more binary consent parameters corresponding to each purpose parameter, each binary consent parameter indicating a consent or dissent of a user to the use of the specific tracking tag for the purpose of the corresponding purpose parameter.

10. The computer-implemented method of claim 1, wherein the selecting step comprises selecting available tracking tags where user consent has been identified by having a specific purpose parameter which has a corresponding binary consent parameter consented to in a corresponding set of tag selection parameters.

11. The computer-implemented method of claim 1, wherein the request includes a website address and the website address is used to determine a subset of the set of available tracking tags available for the comparing step.

12. The computer-implemented method of claim 1, wherein the receiving step comprises receiving the user identifier in the form of a plurality of triangulation data points, where each triangulation data point describes a part of the user identity pseudonymously and the combination of triangulation points describes the user uniquely.

13. The computer-implemented method of claim 12, wherein the triangulation data points include one or more of the group comprising: part of an IP address, information determining existence of cookies on user browser, a type of web browser being used by the user, web browser version, device type being used to access the website, local storage identity, entity tag, and an advertiser identity.

14. The computer-implemented method of claim 1, further comprising:
   receiving an update request for updating a set of tag-selection parameters, the request including a further received user identifier and modifying instructions;
   determining the stored set of tag selection parameters of the user identifier corresponding to the further received user identifier,
   modifying the stored set of tag selection parameters of the user identifier in accordance with the received modifying instructions.

15. The computer-implemented method of claim 1, further comprising receiving the set of available tracking tags from a data collector server.

16. The computer-implemented method of claim 1, wherein the selecting step comprises:
  selecting from the plurality of available tags, a first available tracking tag where the purpose parameter of the available tracking tag corresponds to a specific purpose which has an indication of user consent in the corresponding tag-selection parameters;
  determining a second available tracking tag where the purpose parameter of the available tracking tag has no user consent or dissent;
    obtaining user consent or user dissent from the user for the second available tracking tag; and
  updating the associated set of tag-selection parameters.

17. The computer-implemented method of claim 16, wherein transmitting step comprises transmitting the second available tracking tag to the domain owner server for deployment on the website if user consent has been obtained, at the same time as transmitting the first available tracking tag to the domain suite owner server.

18. The computer-implemented method of claim 16, wherein the first available tracking tag is transmitted to the domain owner server for deployment on the website before the consent for the second available tag has been received.

19. A tag delivery system for providing one or more selected tracking tags to a domain owner server for deployment on a website, the one or more tracking tags being selected from a set of available tracking tags, the system comprising:

a tag data store for storing the set of available tracking tags, each available tracking tag including a purpose parameter describing a use to which data collected by the available tracking tag will be put;
  a selection parameter store for storing a plurality of user identifiers and a plurality of sets of tag-selection parameters, each user identifier identifying a website user and having an associated set of tag-selection parameters which identity a specific tracking tag and indicate whether a user consent has been obtained for a specific purpose of the specific tag;
  a tag request handler for receiving, from the domain owner server, a request for deployment of one or more tracking tags on the website, the request including a received user identifier identifying a user accessing the website;
  a tag selection processor configured, for a user identifier corresponding to the received user identifier, to compare the tag-selection parameters for each specific tracking tag to the purpose parameter of each corresponding available tracking tag; and to select available tracking tags where the purpose parameter of the available tracking tag corresponds to a specific purpose which has an indication of user consent in the corresponding tag-selection parameters; and
  a transmitter for transmitting the selected available tracking tags to the domain owner server for deployment on the website.

* * * * *